(12) United States Patent
Mackler et al.

(10) Patent No.: US 9,903,618 B2
(45) Date of Patent: Feb. 27, 2018

(54) INTEGRATED RENEWABLE ENERGY AND ASSET SYSTEM

(71) Applicant: SunPower Corporation, San Jose, CA (US)

(72) Inventors: Laurence Mackler, Larchmont, NY (US); Brian Cuff, Irvington, NY (US); Hikaru Iwasaka, New York, NY (US); Alexander Keller, New York, NY (US); David Froelich, New York, NY (US)

(73) Assignee: SunPower Corporation, San Jose, CA (US)

( * ) Notice: Subject to any disclaimer, the term of this patent is extended or adjusted under 35 U.S.C. 154(b) by 501 days.

(21) Appl. No.: 14/528,952

(22) Filed: Oct. 30, 2014

(65) Prior Publication Data
US 2015/0113987 A1   Apr. 30, 2015

Related U.S. Application Data

(60) Provisional application No. 61/897,408, filed on Oct. 30, 2013.

(51) Int. Cl.
*F24J 2/40*   (2006.01)
*F24J 2/52*   (2006.01)
(Continued)

(52) U.S. Cl.
CPC .......... *F24J 3/082* (2013.01); *B60L 11/1824* (2013.01); *E04H 6/10* (2013.01); *F24J 2/42* (2013.01);
(Continued)

(58) Field of Classification Search
CPC .............. F03G 6/001; F03G 7/04; F24J 2/461
(Continued)

(56) References Cited

U.S. PATENT DOCUMENTS

| 4,132,074 A | * | 1/1979 | Wendel | F24J 2/0438 |
| | | | | 126/400 |
| 2008/0152492 A1 | * | 6/2008 | Fein | F03D 9/007 |
| | | | | 416/9 |

(Continued)

*Primary Examiner* — Mark Laurenzi
*Assistant Examiner* — Mickey France
(74) *Attorney, Agent, or Firm* — Oblon, McClelland, Maier & Neustadt, L.L.P.

(57) ABSTRACT

An integrated renewable energy and asset system is provided. In some embodiments, the system comprises: an existing parking lot positioned adjacent to a building structure, wherein the existing parking lot has an associated pattern; bore holes that are formed into the existing parking lot, wherein the bore holes are organized based on the pattern of the existing parking lot; vertical columns inserted into at least a first portion of the bore holes, wherein: crossbeams are installed on an upper portion of a vertical column to form a support structure; and a canopy is connected to the crossbeams, wherein the canopy is formed from multiple attached photovoltaic modules and thermal tubes are integrated with the photovoltaic modules; geothermal tubes that capture thermal energy are inserted into at least a second portion of the bore holes, wherein each of the thermal tubes and each of the geothermal tubes is connected to a geothermal heat pump and wherein each of the thermal tubes is connected to the geothermal heat pump; and a hardware processor that is configured to: receive sensor information from sensors disposed on the canopy; determine whether to direct at least a portion of the thermal energy captured using the geothermal tubes to the solar thermal panels based on the received sensor information; and cause the heat captured using the geothermal tubes to be directed to the solar thermal panels based on the determination.

20 Claims, 30 Drawing Sheets

(51) Int. Cl.
    *F24J 3/08*     (2006.01)
    *F24J 2/42*     (2006.01)
    *F28D 20/00*     (2006.01)
    *E04H 6/10*     (2006.01)
    *H02S 20/23*     (2014.01)
    *B60L 11/18*     (2006.01)
    *F24J 2/00*     (2014.01)
    *F03D 9/00*     (2016.01)
    *F24D 17/02*     (2006.01)
    *F24D 3/08*     (2006.01)

(52) U.S. Cl.
    CPC .......... *F28D 20/0043* (2013.01); *H02S 20/23* (2014.12); *B60L 2230/22* (2013.01); *F03D 9/00* (2013.01); *F03D 9/007* (2013.01); *F24D 3/08* (2013.01); *F24D 17/02* (2013.01); *F24D 2200/02* (2013.01); *F24D 2200/11* (2013.01); *F24D 2200/12* (2013.01); *F24D 2200/14* (2013.01); *F24D 2200/15* (2013.01); *F24D 2200/20* (2013.01); *F24J 2002/0092* (2013.01); *F24J 2003/089* (2013.01); *F28D 2020/006* (2013.01); *Y02B 10/12* (2013.01); *Y02B 10/20* (2013.01); *Y02B 10/40* (2013.01); *Y02B 10/70* (2013.01); *Y02B 30/52* (2013.01); *Y02E 10/125* (2013.01); *Y02E 10/40* (2013.01); *Y02E 60/142* (2013.01); *Y02E 70/30* (2013.01)

(58) Field of Classification Search
    USPC ..... 60/641.1–641.6, 641.8–641.15; 136/244, 136/246–248, 251
    See application file for complete search history.

(56) References Cited

U.S. PATENT DOCUMENTS

| | | | | |
|---|---|---|---|---|
| 2010/0000596 A1* | 1/2010 | Mackler | ................ | G09F 11/025 136/246 |
| 2013/0205778 A1* | 8/2013 | Hansen | .................... | F24J 2/045 60/641.8 |
| 2014/0260247 A1* | 9/2014 | Marble | .................... | F03G 7/04 60/641.2 |

\* cited by examiner

INTEGRATED RENEWABLE ENERGY AND ASSET SYSTEM

CROSS-REFERENCE TO RELATED APPLICATION

This application claims the benefit of U.S. Provisional Patent Application No. 61/897,408, filed Oct. 30, 2013, which is hereby incorporated by reference herein in its entirety.

FIELD OF INVENTION

The present invention relates to an integrated renewable energy and asset system. More particularly, the present invention relates generally to an integrated renewable energy, energy security, energy efficiency, transportation, water management, advertisement, and site security system. The present invention can transform and/or convert parking lots, parking garages, and/or building structures into power plants that generate new revenue opportunities while holistically integrating natural resource management systems, which include geothermal energy, wind energy, and water harvesting.

BACKGROUND

Parking lots are a universally untapped resource. Typical parking lots fail to take advantage of multiple technologies and systems that can be seamlessly integrated into their design.

Therefore, there exists a need for a holistically designed, all-in-one parking lot system that integrates multiple renewable energy-producing technologies, such as geothermal, wind, and/or photovoltaics, with energy security systems and additional revenue streams ranging from electric vehicle (EV) car charging to multimedia advertising.

SUMMARY

In accordance with various embodiments of the present invention, an integrated renewable energy and asset system is provided. The all-inclusive system can include one or more of the following components: one or more renewable energy producing technologies, such as photovoltaics, solar thermal, wind energy, and geothermal; one or more energy security systems, such as battery storage and grid resilience technologies; one or more energy efficiency technologies, such as motion sensing LED lighting and eco-pavement; one or more sustainable transportation technologies, such as electric vehicle charging, bicycle parking, and tire pumps; one or more water management systems, such as potable water catchment and grey water catchment; one or more additional revenue methods, such as advertisement, branding, and outdoor event space; and one or more site security technologies, such as video monitoring and motion detection lighting. It should be noted that any suitable combination of components can be included in the integrated renewable energy and asset system.

The integrated renewable energy and asset system can be used in various applications. For example, the disclosed renewable energy and asset system can be integrated into a parking lot, a parking garage, and/or a building structure.

In some embodiments, an integrated renewable energy and asset system is provided, the system comprising: a parking lot that includes a geothermal system configured substantially beneath the parking lot, wherein the geothermal system includes a geothermal heat pump that captures thermal energy and at least a portion of the captured thermal energy is directed to the parking lot to melt snow or ice from the surface of the parking lot; and a plurality of renewable energy production components positioned on the parking lot, wherein at least one of the plurality of renewable energy production components receives the captured thermal energy to melt snow or ice from the surface of the renewable energy production component. In some embodiments, the geothermal heat pump can capture thermal energy using one or more geothermal tubes, wherein the thermal energy can be directed to heat a building adjacent to the parking lot or heat water for the building.

In some embodiments, an integrated renewable energy and asset system is provided, the system comprising: a parking lot that includes a solar thermal system configured substantially above the parking lot, wherein the solar thermal system captures solar energy and at least a portion of the captured solar energy is directed to the parking lot to melt snow or ice from the surface of the parking lot; and a plurality of renewable energy production components positioned on the parking lot, wherein at least one of the plurality of renewable energy production components receives the captured solar energy to melt snow or ice from the surface of the renewable energy production component. In some embodiments, the solar thermal system can capture thermal energy using one or more thermal tubes, wherein the thermal energy can be directed to heat a building adjacent to the parking lot or heat water for the building.

In some embodiments, an integrated renewable energy and asset system is provided, the system comprising: a parking lot that includes a plurality of renewable energy production components positioned on the parking lot, wherein at least one of the plurality of renewable energy production components captures solar energy; and an advertising system that includes one or more advertising screens, wherein the advertising system receives the captured solar energy from at least one of the plurality of renewable energy production components.

In some embodiments, an integrated renewable energy and asset system is provided, the system comprising: a parking lot that includes a plurality of renewable energy production components positioned on the parking lot, wherein at least one of the plurality of renewable energy production components captures solar energy; and a lighting system that includes one or more light fixtures, wherein the one or more light fixtures of the lighting system receive the captured solar energy from at least one of the plurality of renewable energy production components.

In some embodiments, an integrated renewable energy and asset system is provided, the system comprising: a parking lot that includes a plurality of renewable energy production components positioned on the parking lot, wherein at least one of the plurality of renewable energy production components captures solar energy; and a vehicle charging system positioned on the parking lot, wherein the vehicle charging system receives the captured solar energy from at least one of the plurality of renewable energy production components.

In some embodiments, an integrated renewable energy and asset system is provided, the system comprising: a parking lot that includes a plurality of solar canopy systems, wherein each of the solar canopy systems captures solar energy; and a retail space located on the parking lot that receives the captured solar energy from at least one of the plurality of solar canopy systems, wherein the solar canopy system is integrated to shelter the retail space.

In some embodiments, an integrated renewable energy and asset system is provided, the system comprising: a parking lot that includes a plurality of renewable energy production components positioned on the parking lot, wherein at least one of the plurality of renewable energy production components captures solar energy; and a video monitoring system that includes one or more cameras, wherein the one or more cameras of the video monitoring system receives the captured solar energy from at least one of the plurality of renewable energy production components.

In some embodiments, an integrated renewable energy and asset system is provided, the system comprising: a parking lot that includes a plurality of renewable energy production components positioned on the parking lot, wherein each of the plurality of renewable energy production components captures solar energy; and a storage system positioned on the parking lot, wherein the storage system receives the captured solar energy from each of the plurality of renewable energy production components.

In some embodiments, an integrated renewable energy and asset system is provided, the system comprising: technologies for producing renewable energy; energy security systems for energy storage and grid stabilization; energy efficiency technologies for reducing energy consumption; transportation related technologies for the reduction of $CO_2$ emissions; water management systems for potable water and grey water catchment; additional revenue methods for advertisement, branding, new retail opportunities, and outdoor event space; and security technologies for site surveillance and protection.

In some embodiments, the integrated renewable energy and asset system further comprises a photovoltaic carport canopy for providing cars and people with protection from weather related elements such as snow, rain, and sun, wherein electricity produced by the photovoltaic carport canopy is used or sold back to the grid.

In some embodiments, the integrated renewable energy and asset system further comprises a photovoltaic roof-mount system for electricity production for on site utilization or for selling back to the grid.

In some embodiments, the integrated renewable energy and asset system further comprises photovoltaic modules integrated within the exterior envelope material of a building for on site utilization or for selling back to the grid, wherein the photovoltaic modules protect the building from weather related elements.

In some embodiments, the integrated renewable energy and asset system further comprises a geothermal system coupled with photovoltaics for producing renewable energy that can either be utilized on site or sold back to the utilities, wherein the geothermal system melts snow and ice on the surface on and around a parking lot and building.

In some embodiments, the integrated renewable energy and asset system further comprises a solar thermal system coupled with photovoltaics for producing renewable energy that can either be utilized on site or sold back to the utilities, wherein the solar thermal system melts snow and ice on top of the solar carport canopy. In some embodiments, the solar thermal system can capture thermal energy using one or more thermal tubes, wherein the thermal energy can be directed to heat a building adjacent to the parking lot or heat water for the building.

In some embodiments, the integrated renewable energy and asset system further comprises a photovoltaic integrated billboard or flag for advertisement or branding, wherein the electricity produced by the photovoltaic integrated billboard or flag is used or sold back to the grid.

In some embodiments, the integrated renewable energy and asset system further comprises an energy storage system that includes one or more batteries for collection of produced energy.

In some embodiments, the integrated renewable energy and asset system further comprises a grid resiliency system for providing demand response and stabilization to the utility grid.

In some embodiments, the integrated renewable energy and asset system further comprises an exterior lighting system for providing adequate illumination and site security to the parking lot of the building.

In some embodiments, the integrated renewable energy and asset system further comprises eco-pavement for reducing energy loads and reducing the heat island effect.

In some embodiments, the integrated renewable energy and asset system further comprises electric vehicle charging stations for allowing electric vehicles to be charged.

In some embodiments, the integrated renewable energy and asset system further comprises bicycle parking.

In some embodiments, the integrated renewable energy and asset system further comprises tire pump storage for maintaining proper car and bike tire pressure.

In some embodiments, the integrated renewable energy and asset system further comprises a potable water catchment system for collecting potable water that lands on the parking lot or building site. In some embodiments, the solar thermal system or the geothermal system can work in connection with the water catchment system, wherein the captured thermal energy can be directed to heat water from the water catchment system for the building.

In some embodiments, the integrated renewable energy and asset system further comprises a grey water catchment system for collecting grey water that lands on the parking lot or building site. In some embodiments, the solar thermal system or the geothermal system can work in connection with the water catchment system, wherein the captured thermal energy can be directed to heat water from the water catchment system for the building.

In some embodiments, the integrated renewable energy and asset system further comprises surfaces for advertisement or visual messaging. In some embodiments, the integrated renewable energy and asset system further comprises surfaces for branding or other visual identity marketing. In some embodiments, the integrated renewable energy and asset system further comprises space for new retail opportunities. In some embodiments, the integrated renewable energy and asset system further comprises space and protection for outdoor events.

In some embodiments, the integrated renewable energy and asset system further comprises video surveillance equipment for providing site security.

In some embodiments, the integrated renewable energy and asset system further comprises a weight-based energy storage system located substantially beneath the parking lot.

In accordance with some embodiments, an integrated renewable energy and asset system is provided, the system comprising: an existing parking lot positioned adjacent to a building structure, wherein the existing parking lot has an associated pattern; a plurality of bore holes that are formed into the existing parking lot, wherein the plurality of bore holes are organized based on the pattern of the existing parking lot; a plurality of vertical columns inserted into at least a first portion of the plurality of bore holes, wherein: a plurality of crossbeams are installed on an upper portion of a vertical column to form a support structure; and a canopy is connected to the plurality of crossbeams and positioned on the support structure, wherein the canopy is formed from a plurality of attached photovoltaic modules and wherein a plurality of thermal tubes are integrated with the plurality of attached photovoltaic modules; a plurality of geothermal tubes that capture thermal energy are inserted into at least a second portion of the plurality of bore holes, wherein each of the plurality of thermal tubes and each of the plurality of geothermal tubes are connected to a geothermal heat pump and wherein each of the plurality of thermal tubes is connected to the geothermal heat pump; and a hardware processor that is configured to: receive sensor information from a plurality of sensors disposed on the canopy; determine whether to direct at least a portion of the thermal energy captured using the plurality of geothermal tubes to the plurality of solar thermal panels based on the received sensor information; and cause at least a portion of the thermal energy captured using the plurality of geothermal tubes to be directed to the plurality of solar thermal panels based on the determination.

In some embodiments, a lower portion of the vertical column of the plurality of vertical columns is positioned above a geothermal tube of the plurality of geothermal tubes within a bore hole. In some embodiments, a first portion of the plurality of geothermal tubes are inserted in bore holes that are made in a foundation beneath the existing parking structure and wherein a second portion of the plurality of geothermal tubes are integrated within the vertical column that sits on the existing parking structure.

In some embodiments, the system further comprises solar thermal heat traces installed beneath areas designated on the existing parking lot, wherein the hardware processor is further configured to determine whether to divert thermal energy stored in the geothermal heat pump to the solar thermal heat traces to melt snow or ice.

In some embodiments, the system further comprises geothermal heat traces installed beneath areas designated on the existing parking lot, wherein the hardware processor is further configured to determine whether to divert thermal energy stored in the geothermal heat pump to the geothermal heat traces to melt snow or ice.

In some embodiments, the plurality of sensors include a temperature sensor connected to a surface of the areas designated on the existing parking lot, wherein the temperature sensor or the image sensor transmits temperature information relating to the surface of the areas to the hardware processor. In some embodiments, the plurality of sensors include an image sensor connected to a surface of the areas designated on the existing parking lot, wherein the image sensor transmits imaging information relating to the surface of the areas to the hardware processor.

In some embodiments, the system further comprises a cistern installed beneath the existing parking lot, wherein water from a surface of the canopy is diverted through the column and into the cistern. In some embodiments, the system further comprises a water usage sensor connected to a water containment unit corresponding to the building structure, wherein the water usage sensor transmits water usage information to the hardware processor and wherein the hardware processor determines whether to transmit water from the cistern to the water containment unit. In some embodiments, the system further comprises: a first cistern connected to the plurality of geothermal tubes, wherein the plurality of geothermal tubes transfer thermal energy to water contained in the first cistern; a second cistern connected to the plurality of solar thermal panels, wherein the plurality of solar thermal panels transfer thermal energy to water contained in the second cistern; and a third cistern in fluid communication with the first cistern and the second cistern, wherein the third cistern collects the water from each of the first cistern and the second cistern.

In some embodiments, the system further comprises a plurality of inverters that are each mounted to one of the plurality of vertical columns, wherein each of the plurality of inverters converts direct current output from the plurality of attached photovoltaic modules to an alternating current; and an energy storage unit that receives the alternating current from each of the plurality of inverters, wherein the hardware processor is further configured to determine whether to direct the alternating current to at least one of: a utility grid, a device installed on one of the plurality of vertical columns, and the building structure.

In some embodiments, the energy storage unit is a weight-based energy storage system that is located in at least one of the plurality of bore holes beneath the existing parking lot.

In some embodiments, the system further comprises: a retail space that is electrically connected to the central inverter and at least a portion of the plurality of attached photovoltaic modules, wherein the retail space is positioned such that a portion of a roof structure of the retail space is provided by the canopy that supports the plurality of attached photovoltaic modules and the plurality of thermal tubes; wherein the hardware processor is further configured to direct alternating current from the storage battery to one or more devices installed in the retail space and direct the thermal energy from the geothermal heat pump to a heat trace installed beneath an area of the existing parking lot that corresponds to the retail space.

In some embodiments, the system further comprises a plurality of wind turbines that are electrically connected to the energy storage unit and the plurality of attached photovoltaic modules, wherein the plurality of wind turbines are organized in a first row that is substantially parallel to a second row that includes the plurality of vertical columns.

In some embodiments, the hardware processor is further configured to: receive a request from a utility grid for electrical energy; transmit a request to one or more sensors connected to the energy storage unit; determine whether the energy storage unit is capable of responding to the received request; and transmit an instruction to the energy storage unit to provide stored electrical energy from the energy storage unit to an input of the utility grid.

In some embodiments, the system further comprises an advertising system that includes one or more display screens for presenting advertisements, wherein the advertising system receives at least a portion of the alternating current from the energy storage unit.

In some embodiments, the system further comprises a lighting system that includes a plurality of light sources, wherein the lighting system receives at least a portion of the alternating current from the energy storage unit. In some embodiments, the hardware processor is further configured to detect motion in an area corresponding to one of the plurality of light sources and, in response to the detection, direct the portion of the alternating current from the energy storage unit to that light source.

In some embodiments, the system further comprises an electric vehicle charging station that is positioned adjacent to at least one of the plurality of vertical columns, wherein the electric vehicle charging station is electrically connected to the energy storage unit and at least one of the plurality of photovoltaic modules and wherein the electric vehicle charging station receives power from the energy storage unit or a photovoltaic module.

In some embodiments, the hardware processor is further configured to: determine, using one or more web resources, whether snow or ice is likely to be deposited on a surface of the plurality of attached photovoltaic modules or an area of the existing parking lot; and cause the geothermal heat pump to direct the thermal heat captured by the plurality of geothermal tubes to be directed to the plurality of thermal tubes that are integrated with the plurality of attached photovoltaic modules or thermal traces.

DETAILED DESCRIPTION

Figure 1:
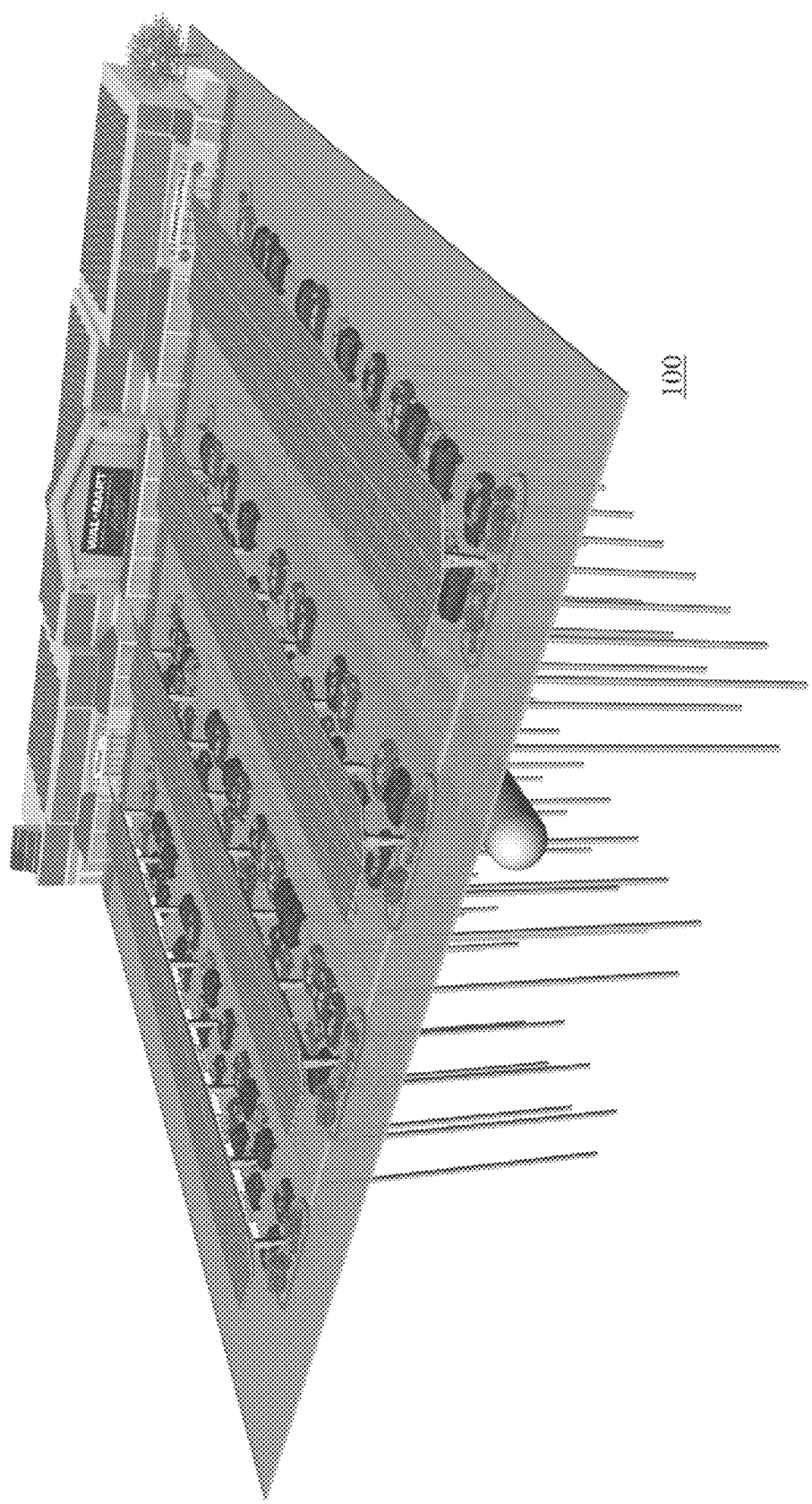
FIGS. 1-5 show illustrative examples of an integrated renewable energy and asset system in accordance with some embodiments of the disclosed subject matter.

In accordance with some embodiments of the disclosed subject matter, an integrated renewable energy and asset system is provided.

Generally speaking, the integrated renewable energy and asset system includes a framework of columns, crossbeams, support beams, purlins, and canopies to support the installation of one or more components—such as one or more renewable energy producing technologies, such as photovoltaics (e.g., the solar carport structures installed on the parking lot structure that can capture solar energy, the solar rooftop structures installed on the building structure that can capture solar energy, etc.), wind energy (e.g., a single wind turbine that is connected to the system, a row of wind turbines that are parallel to a row of solar carport structures, etc.), solar thermal (e.g., solar thermal panels installed on the canopy of the solar carport structures), and geothermal (e.g., geothermal tubes installed beneath the parking lot structure); one or more energy security systems, such as battery storage and grid resilience technologies; one or more energy efficiency technologies, such as motion sensing LED lighting and eco-pavement; one or more sustainable transportation technologies, such as electric vehicle charging, bicycle parking, and tire pumps; one or more water management systems, such as potable water catchment and grey water catchment (e.g., a water catchment cistern installed at the same time as the columns of the solar carport structure, where water from the surface of the solar carport structure is diverted through the column and into a cistern installed beneath the parking lot structure); one or more additional revenue methods, such as advertisement, branding, and outdoor event space (e.g., a powered billboard attached to a column of the solar carport structure); and one or more site security technologies, such as video monitoring and motion detection lighting (e.g., video monitors installed to columns and/or purlins of the solar carport structure, where solar energy is sent to an inverter that controls when energy is used to power various components). It should be noted that any suitable combination of components can be included in the integrated renewable energy and asset system.

In an embodiment that includes an existing parking lot, a structural framework can include parallel rows of bore holes drilled into the existing parking lot, where the location of the bore holes is based on the orientation of the parking lot (e.g., the organization of the parking areas, the orientation of the parking lot in connection with an adjacent building, etc.). Each of these bore holes can be drilled by, for example, Caisson drilling or spread footing digging. In some embodiments, into one or more of these bore holes, the structural framework can include geothermal tubes that are inserted into the deepest portion of a bore hole, a vertical column that extends vertically upward from the bore hole (where the base of the vertical column can be above the geothermal tube), piping or any other suitable connections between the geothermal tubes and the vertical column, wiring or any other suitable connections between the vertical column and components supported by the vertical column (e.g., photovoltaic modules on a canopy structure supported by the vertical column, a vehicle charging station connected to the vertical column, etc.), etc. Additionally or alternatively, the structural framework can include geothermal tubes that are inserted into some of the bore holes, where geothermal trenches can be made that connect the geothermal tubes to a geothermal heat pump, and vertical columns or other supports for supporting photovoltaic modules are inserted into other bore holes, where electrical trenches can be made that connect the photovoltaic modules to a central inverter or any other suitable storage unit.

In some embodiments, while the bore holes are being drilled into the existing parking lot, the structural framework can also include a water catchment cistern and piping or any other suitable connections between the vertical column, the cistern, and/or an alternative water storage unit. In some embodiments, while the bore holes are being drilled into the existing parking lot, the structural framework can also include thermal heat traces that are positioned beneath particular parking areas or other designated areas (e.g., walkways). These thermal heat traces can be connected to the geothermal tubes, the solar thermal tubes supported by the vertical column, or any suitable thermal storage unit that is connected to the geothermal system. Upon forming the structural framework in each of the bore holes, portions of the structural foundation in the bore holes can be filled in with secured to the foundation by a footing made of concrete or any other suitable foundation material subject to local requirements, structural considerations, seismic considerations, and other requirements and preferences.

In some embodiments, the integrated renewable energy and asset system can include a controller or any other suitable control system that receives information from various sensors to direct the various types of energy captured by the integrated renewable energy and asset system. For example, the controller can receive temperature information from an electric inverter, a geothermal sensor, a solar thermal sensor, and/or any other suitable sensor to determine when thermal energy is to be directed to a canopy structure to melt ice or snow, to a parking area to melt ice or snow, to heat an adjacent building, to heat water for an adjacent building, to heat a parking area, etc. In another example, the controller can receive energy production levels from an electric inverter or energy storage unit to determine when energy captured by various photovoltaic modules in the integrated renewable energy and asset system is directed to a particular component (e.g., video cameras, lighting, security alarms, displays, etc.) or directed to a utility grid. In yet another example, the controller can receive water level or water usage data from a building adjacent to the parking lot and, in response to detecting that the water level is below a threshold amount, can direct water from one or more cisterns positioned beneath the parking lot to the building. In a further example, the controller can transmit signals to a geothermal heat pump, an electrical storage unit, or any other suitable subsystem of the integrated renewable energy and asset system to direct the energy to a particular component (e.g., electrical power to a video monitoring system, thermal energy to the surface of a solar carport structure, electricity to a utility grid, etc.).

These and other features of the integrated renewable energy and asset system are further described in connection with FIGS. 1-30.

FIG. 1 shows an illustrative example of an integrated renewable energy and asset system in accordance with some embodiments of the disclosed subject matter. As shown, the integrated renewable energy and asset system has been installed in connection with a retailer having a building structure and a parking lot. As also shown, upon installing a framework that supports the integrated renewable energy and asset system, one or more components can be installed on portions of the framework. As described herein, these components can include one or more renewable energy producing technologies, such as photovoltaics (e.g., the solar carport structures installed on the parking lot structure that can capture solar energy, the solar rooftop structures installed on the building structure that can capture solar energy, etc.), wind energy (e.g., a single wind turbine that is connected to the system, a row of wind turbines that are parallel to a row of solar carport structures, etc.), solar thermal (e.g., solar thermal panels installed on the canopy of the solar carport structures), and geothermal (e.g., geothermal tubes installed beneath the parking lot structure that are connected to a geothermal heat pump); one or more energy security systems, such as battery storage and grid resilience technologies; one or more energy efficiency technologies, such as motion sensing LED lighting and eco-pavement; one or more sustainable transportation technologies, such as electric vehicle charging, bicycle parking, and tire pumps; one or more water management systems, such as potable water catchment and grey water catchment (e.g., a water catchment cistern installed at the same time as the columns of the solar carport structure, where water from the surface of the solar carport structure is diverted through the column and into a cistern installed beneath the parking lot structure); one or more additional revenue methods, such as advertisement, branding, and outdoor event space (e.g., a powered billboard attached to a column of the solar carport structure); and one or more site security technologies, such as video monitoring and motion detection lighting (e.g., installed to columns and/or purlins of the solar carport structure, where solar energy is sent to an inverter that controls when energy is used to power various components). It should be noted that any suitable combination of components can be included in the integrated renewable energy and asset system.

FIGS. 2-5 show illustrative examples of the integrated renewable energy and asset system being installed in connection with alternative structures.

Figure 2:
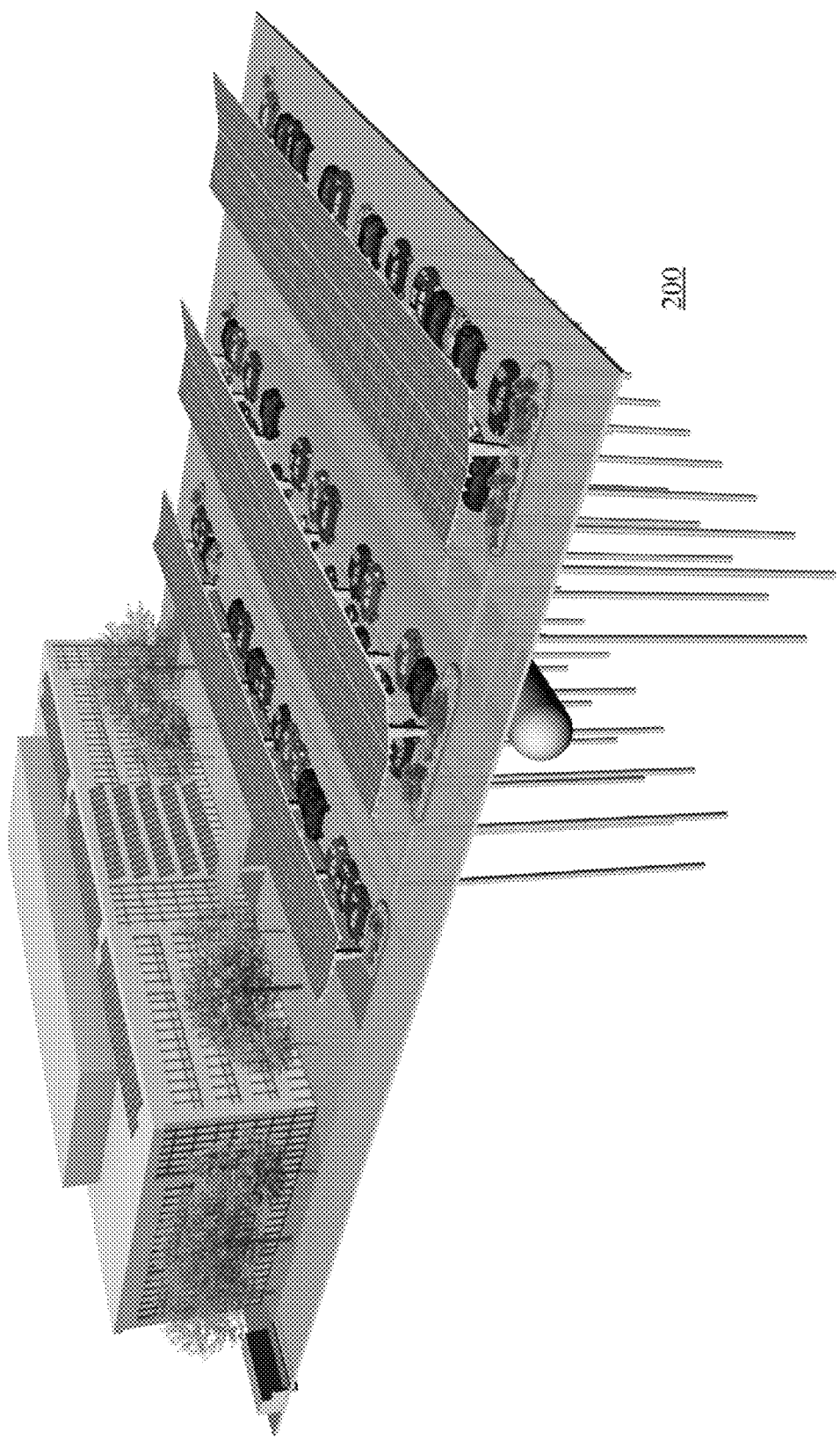

For example, FIG. 2 shows that the integrated renewable energy and asset system can be installed in connection with an existing office building having a building structure and a parking lot. As shown, upon installing a framework that supports the integrated renewable energy and asset system, components can be installed onto the framework that include a solar rooftop structure on the office building, solar windows on the office building, solar carports over an existing parking lot structure, a water cistern beneath the existing parking lot structure where water from the surface of the solar carports is diverted into the cistern, etc.

Figure 3:
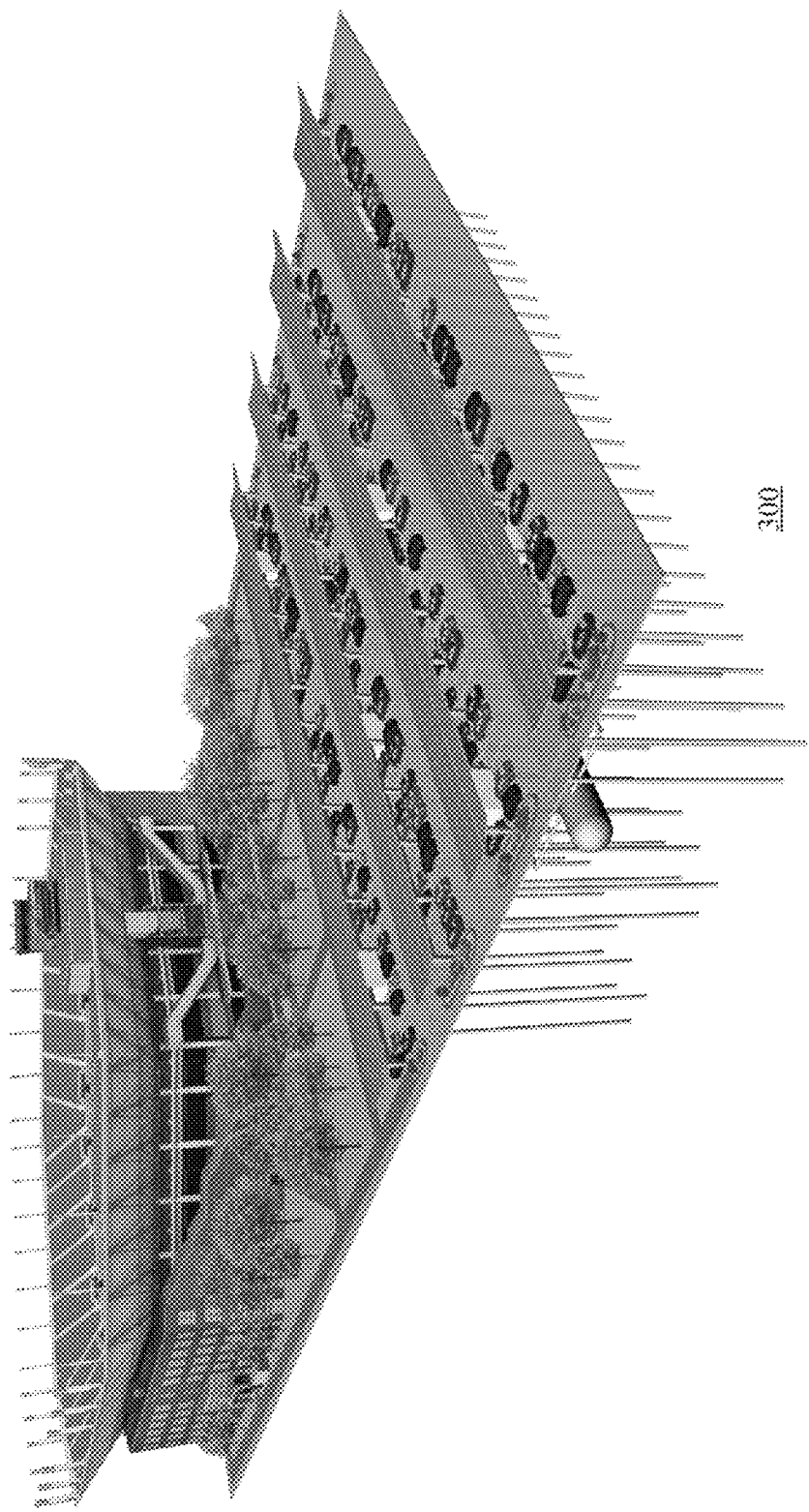

In another example, FIG. 3 shows that the integrated renewable energy and asset system can be installed in connection with an existing stadium or event space having a parking lot. As shown, upon installing a framework that includes geothermal tubes inserted beneath each of the columns formed for a solar carport structure and a cistern beneath the surface of the parking lot structure, an elongated solar carport structure can be formed that directs thermal energy captured by solar thermal panels to a portion of the geothermal tubes or to a geothermal heat pump, directs solar energy captured by solar photovoltaic panels to a storage system, and directs water from the surface of the solar carports for storage in the cistern. It should be noted that, in some embodiments, the connections for diverting the thermal energy from the solar thermal panels to the geothermal heat pump, connections for diverting the solar energy from the solar photovoltaic panels to the storage system, and connections for diverting the water from the surface or surfaces of the solar carport structures to the cistern or a water tank can each be formed within the support column of each of the solar carport structures. For example, PVC or cast iron pipes can be installed within the support column to transport different types of energy (e.g., cast iron pipes to transport thermal energy from solar thermal panels to a geothermal heat pump, PVC pipes to transport water from the surface of the solar carport structure to a cistern or holding tank, etc.).

Figure 4:
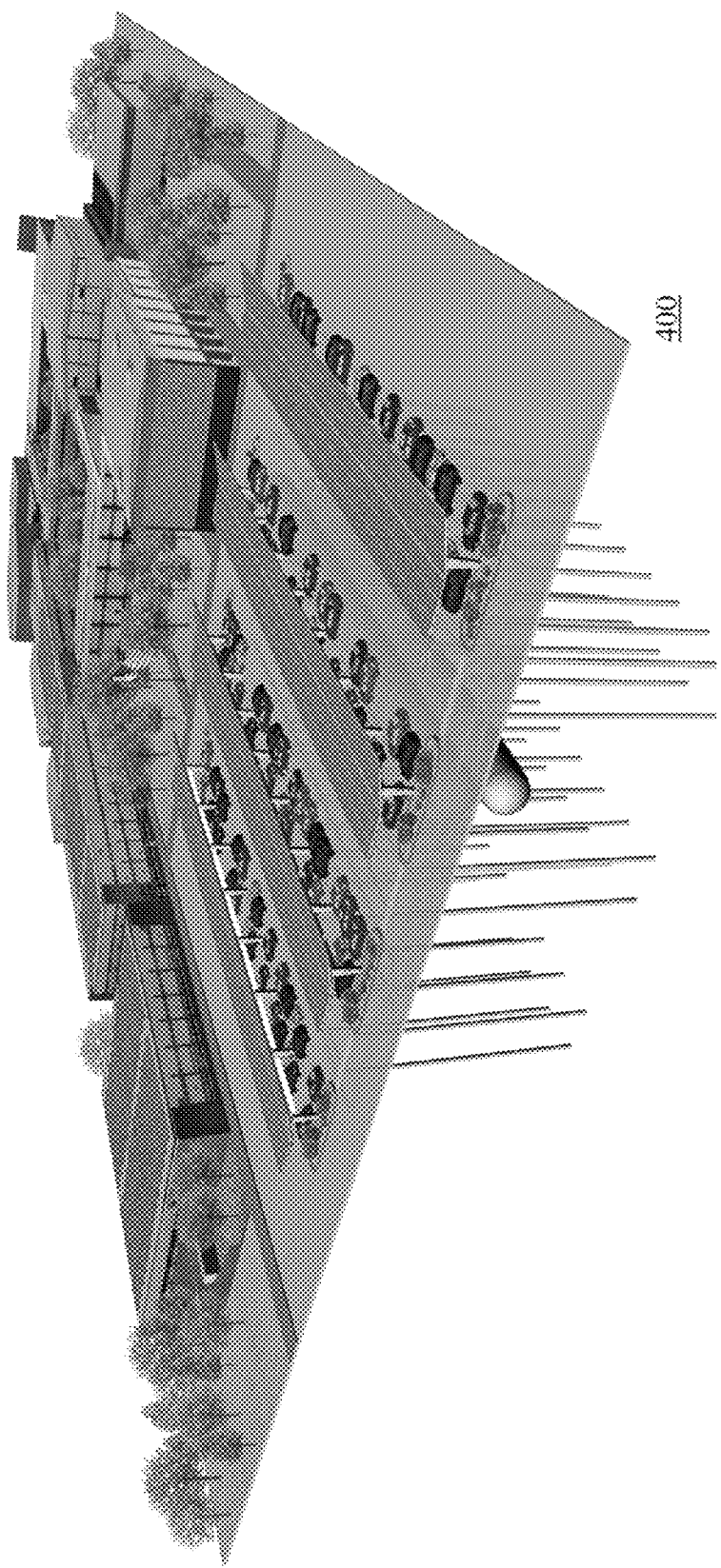
Figure 5:
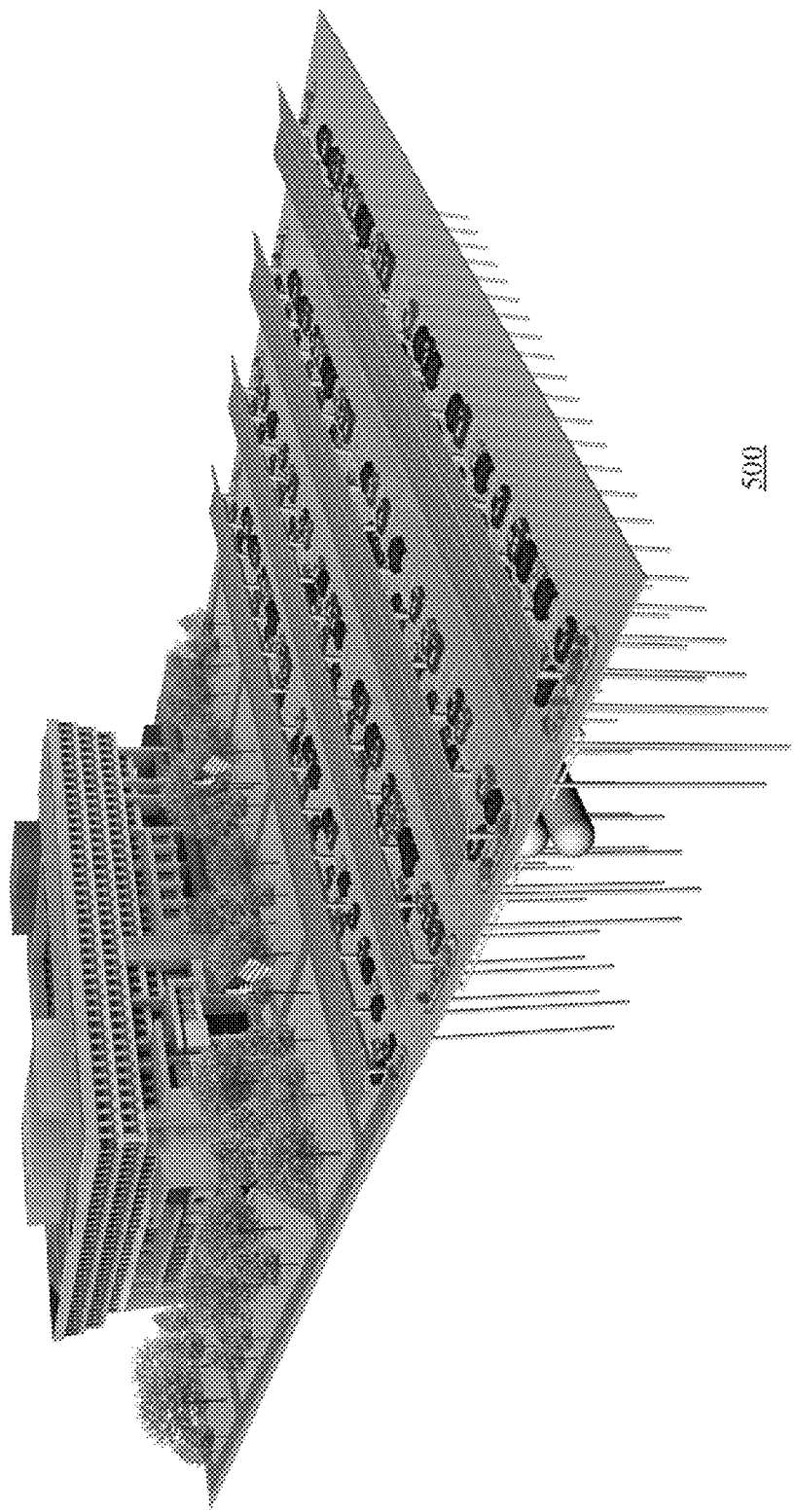

FIGS. 4 and 5 show illustrative examples of the integrated renewable energy and asset system being implemented in connection with alternative structures.

It should be noted that the framework for supporting the integrated renewable energy and asset system can include any suitable number of columns, crossbeams, purlins, etc. For example, as described herein, the framework can be formed on an existing parking lot that includes support structures for solar carports or canopy structures, support structures for a cistern or water management system, support structures for a geothermal system, etc.

Figure 6:
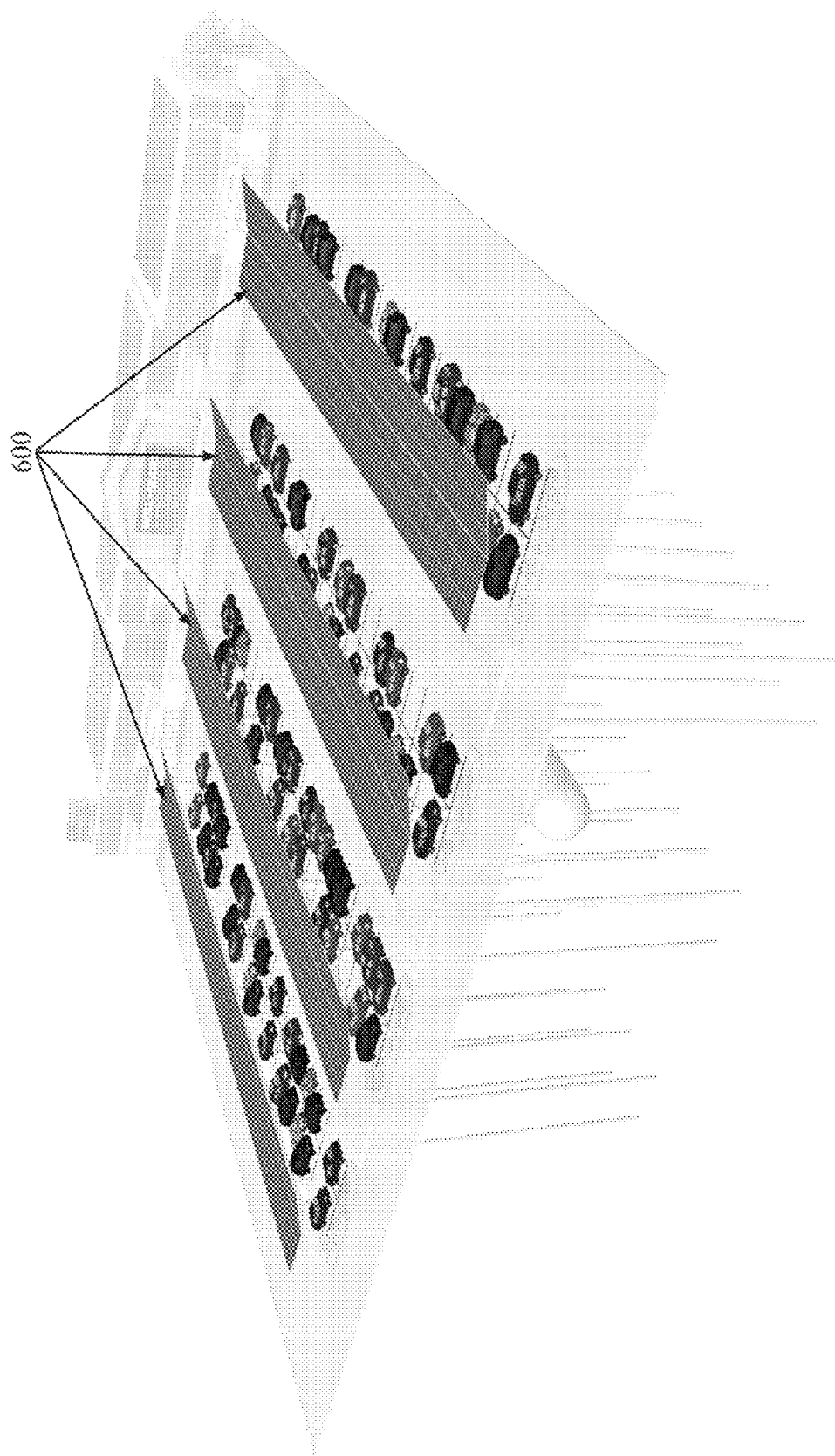
FIG. 6 is an illustrative example of a solar carport canopy that includes photovoltaic modules in accordance with some embodiments of the disclosed subject matter.

In some embodiments, the integrated renewable energy and asset system can include a carport canopy with integrated photovoltaic modules 600 as illustrated in FIG. 6. Generally speaking, the carport structure and photovoltaic modules can provide cars and people with protection from weather related elements, such as snow, rain, and sun and the photovoltaic modules 600 can produce clean and renewable energy that can be utilized by an adjacent building or sold back directly to a utility grid. Since the photovoltaic canopies are located close to the ground, they are highly visible and can attractively promote a company's commitment to sustainability.

It should be noted that, in some embodiments, carport canopy 600 can be formed based on a pattern associated with the existing parking lot. For example, as shown in FIG. 6, carport canopy 600 can be formed such that it covers a particular portion of parking areas in the existing parking lot.

As described herein, rows of columns can be placed in an existing parking lot structure, where bore holes are drilled into the foundation of the existing parking lot structure. For example, Caisson drilling can be performed to create deep bore holes that can accommodate a geothermal tube beneath a column for supporting a solar canopy or solar parking structure. In another example, as Caisson drilling is performed to create a bore hole, connections to geothermal systems, connections to cistern systems, and/or other suitable connections can be made between system connectors that are positioned within the bore hole and the column.

Figure 28:
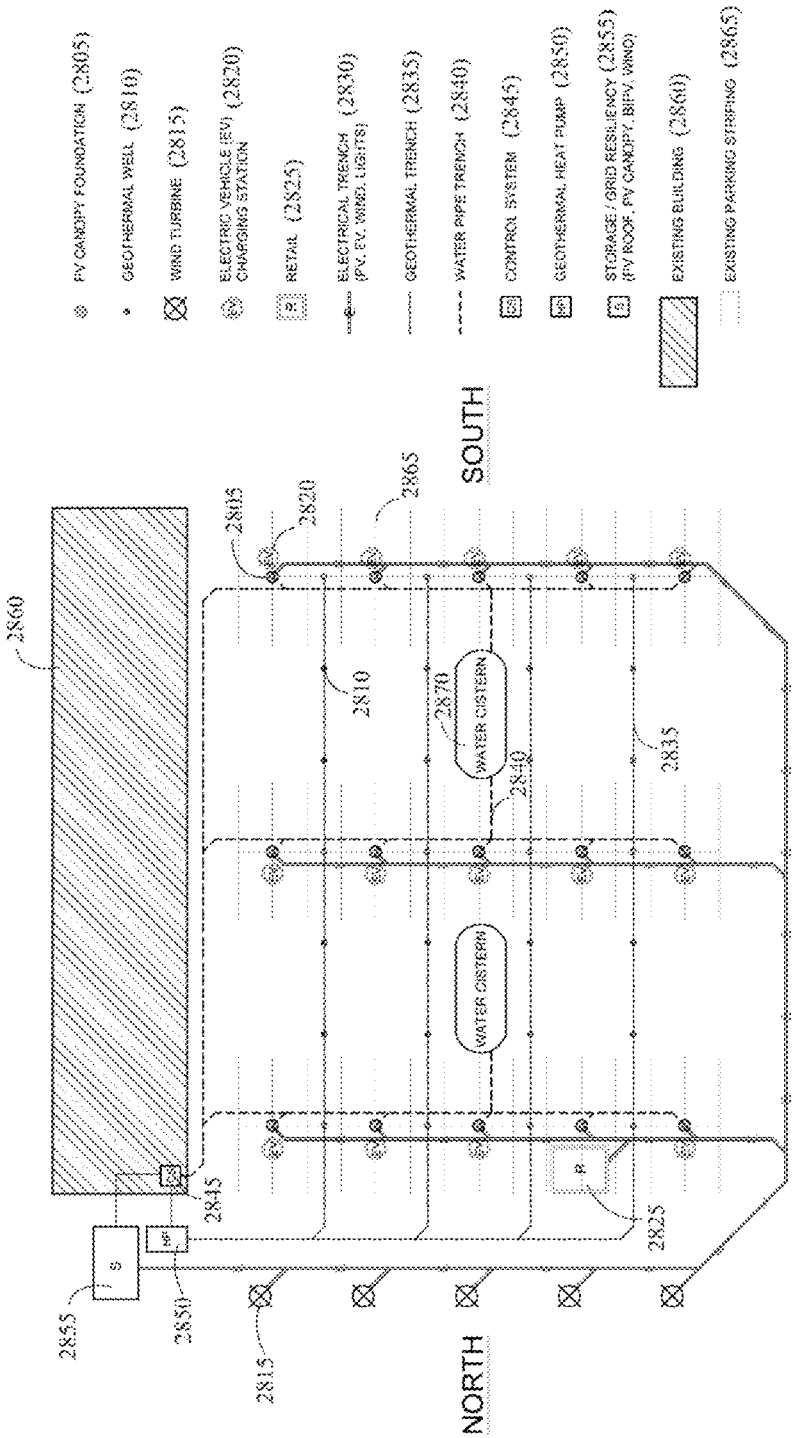
FIGS. 28 and 29 show illustrative examples of an integrated renewable energy and asset system implemented in a parking lot, where the integrated renewable energy and asset system is controlled by a control system of FIG. 27, in accordance with some embodiments of the disclosed subject matter.
Figure 29:
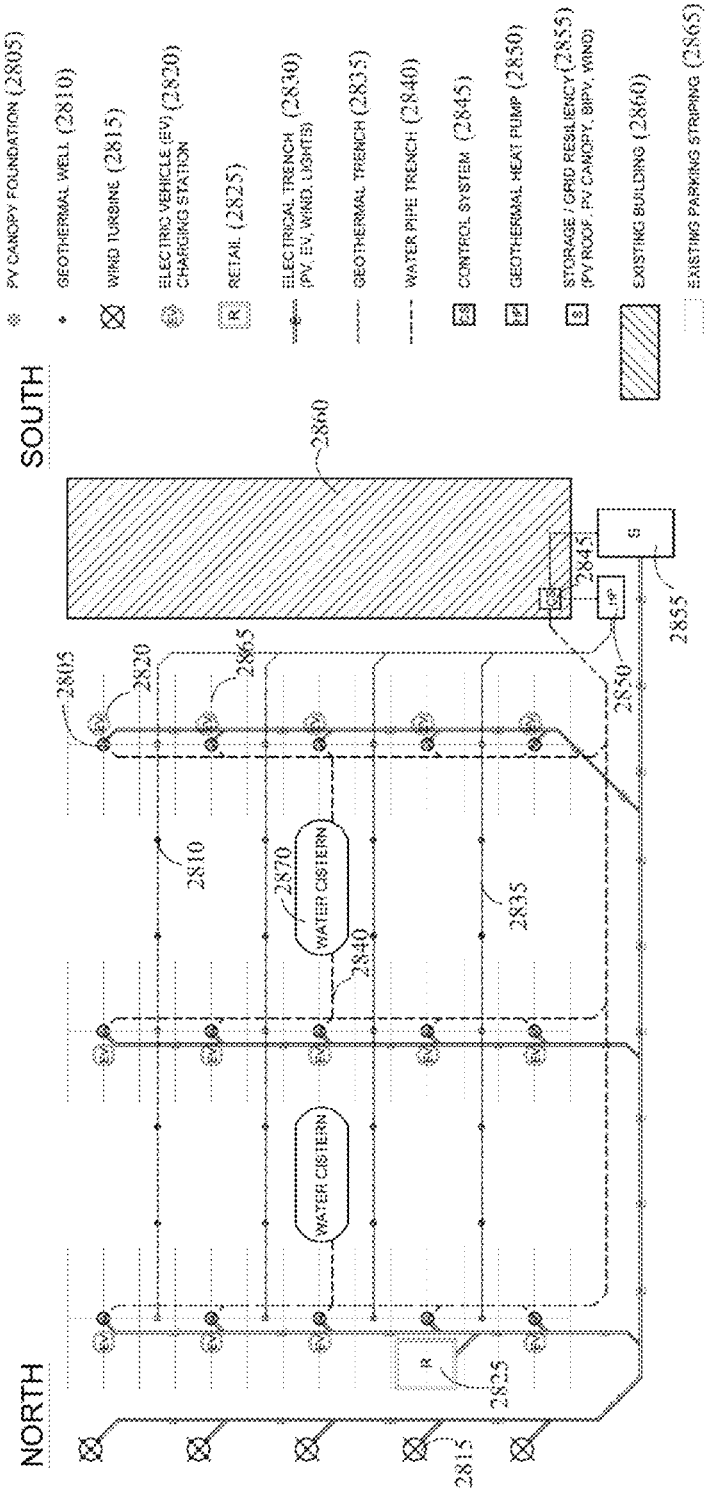

In a more particular example, FIG. 28 shows that bore holes for these columns can be placed based on an existing parking striping pattern. In this example, columns are placed in particular bore holes such that they form parallel rows of vertical columns for supporting photovoltaic structures, where the rows of columns are perpendicular to the front of an existing building structure. Alternatively, FIG. 29 shows that columns are placed in particular bore holes such that they form parallel rows of vertical columns for supporting photovoltaic structures, where the rows of columns are parallel to the front of an existing building structure.

It should be noted that, in some embodiments, bore hole placement and, in turn, vertical column placement can be based on any suitable factors, such as optimal energy production for the photovoltaic panels, optimal energy production for the geothermal tubes, etc.

Each vertical support column can be placed in the bore hole and secured to the foundation by a footing made of concrete or any other suitable foundation material subject to local requirements, structural considerations, seismic considerations, and other requirements and preferences. Each vertical support column can include multiple crossbeams attached to the upper portion of the vertical support column such that the multiple crossbeams form a v-shaped structure for supporting a solar canopy of solar panels. It should be noted that the multiple crossbeams can form any other suitable support structure for supporting the photovoltaic modules. In some embodiments, purlins can be attached to the multiple crossbeams to also support the solar canopy of solar panels. For example, multiple purlins that are parallel to each other can be attached to connect crossbeams across multiple columns, where the multiple crossbeams are perpendicular to the multiple purlins. In this example, using this framework of columns, crossbeams, and purlins, a continuous solar canopy structure across the existing parking lot structure can be installed.

In some embodiments, the vertical support column can have a hollow interior, where additional pipes, wiring, or other connectors can be routed through the hollow interior of the vertical support column. For example, the output from the photovoltaic modules on the carport canopy can be directed via wiring to a micro-inverter that is connected to the vertical support column. In another example, the carport canopy can be installed on the v-shaped structure such that water that falls on the surface of the canopy flows to a drainage cavity that directs the water through pipes within the hollow interior of the vertical support column to a cistern or other holding tank. In yet another example, tubes that transport heat to and from the solar thermal tubes on the surface of the carport canopy can be installed within the hollow interior of the vertical support column and connected via trenches to the geothermal heat pump or a thermal storage unit.

These and other solar structures that have integrated photovoltaic modules are further described for example, in commonly-owned, commonly assigned U.S. patent application Ser. No. 12/497,392, filed Jul. 2, 2009, and U.S. patent application Ser. No. 12/497,461, filed Jul. 2, 2009, which are incorporated by reference herein in their entireties.

Figure 7:
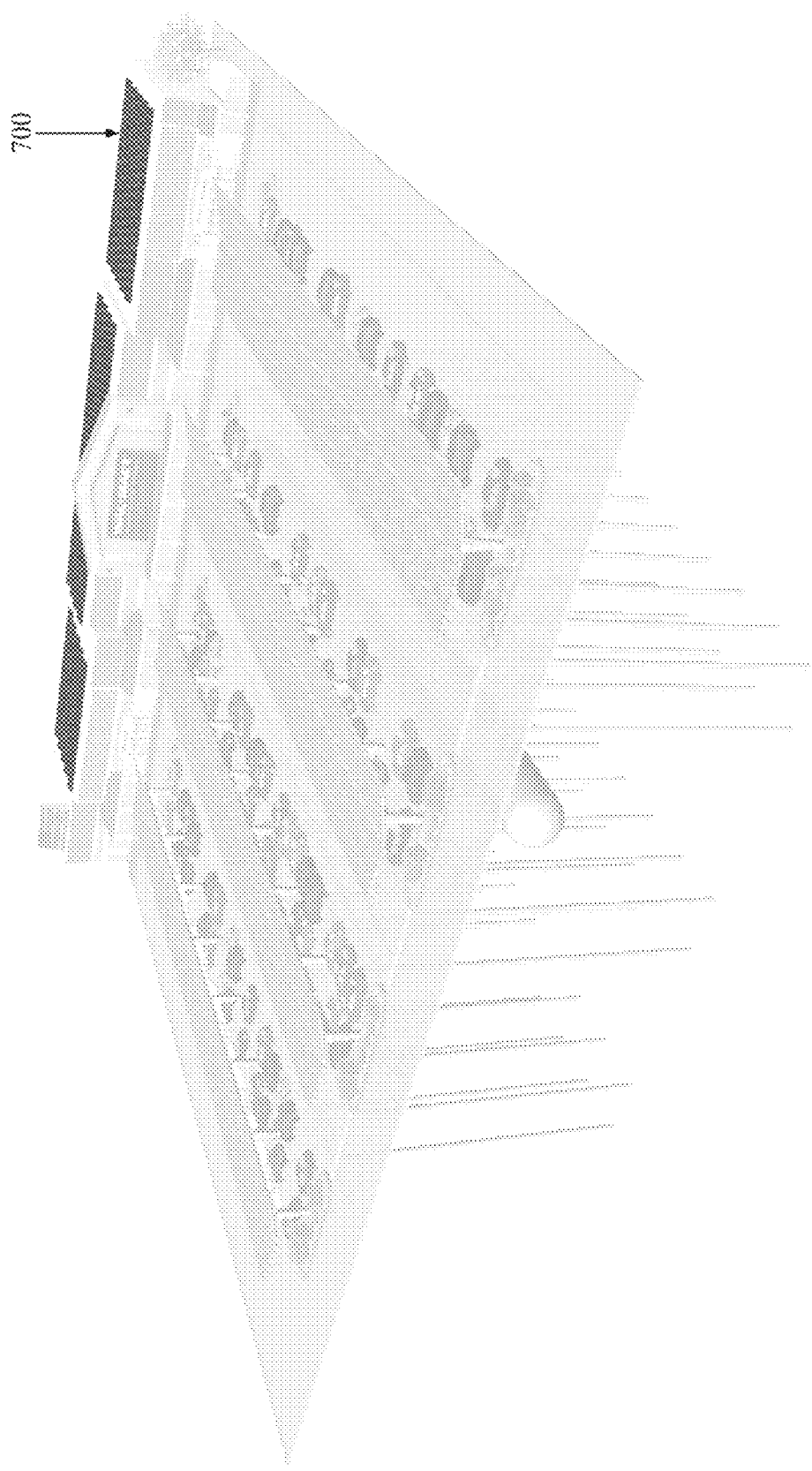
FIG. 7 is an illustrative example of a solar rooftop structure that includes photovoltaic modules in accordance with some embodiments of the disclosed subject matter.

In some embodiments, roof mounted photovoltaic modules 700 installed on top of a parking lot's adjacent building or structure can be included within the integrated renewable energy and asset system as illustrated in FIG. 7. The photovoltaic modules 700 can produce clean and renewable energy that can be utilized by a building or sold back directly to the grid. For example, the photovoltaic modules 700 installed as part of a rooftop solar structure can be connected to an inverter that is adapted to supply power from photovoltaic modules 700 to an electrical utility grid. In another example, the photovoltaic modules 700 installed as part of a rooftop solar structure can be connected to a controller that determines whether to supply power from photovoltaic modules 700 to an electrical utility grid, whether to supply power to the building structure on which photovoltaic modules 700 are placed, and/or whether to supply power to one or more components of the integrated renewable energy and asset system (e.g., video cameras, lighting, security alarms, displays, etc.).

It should be noted that the tilt angle of the modules is adjustable and can be positioned based on the specific geographic location of the building.

It should also be noted that the output of photovoltaic modules 700 can be connected to an inverter for converting the captured energy from direct current to alternating current. For example, as shown in FIGS. 28 and 29, photovoltaic modules 700 that are installed on the roof of existing building 2860 can direct the captured energy to a storage unit or central inverter 2855 that is adjacent to existing building 2860. In a more particular example, each of the photovoltaic modules 700 can be connected to a micro-inverter, where the alternating current output of each micro-inverter can be directed to an energy storage unit. In another more particular example, each of the photovoltaic modules 700 can be connected a central inverter that converts the direct current to alternative current for storage in the energy storage unit.

Figure 8:
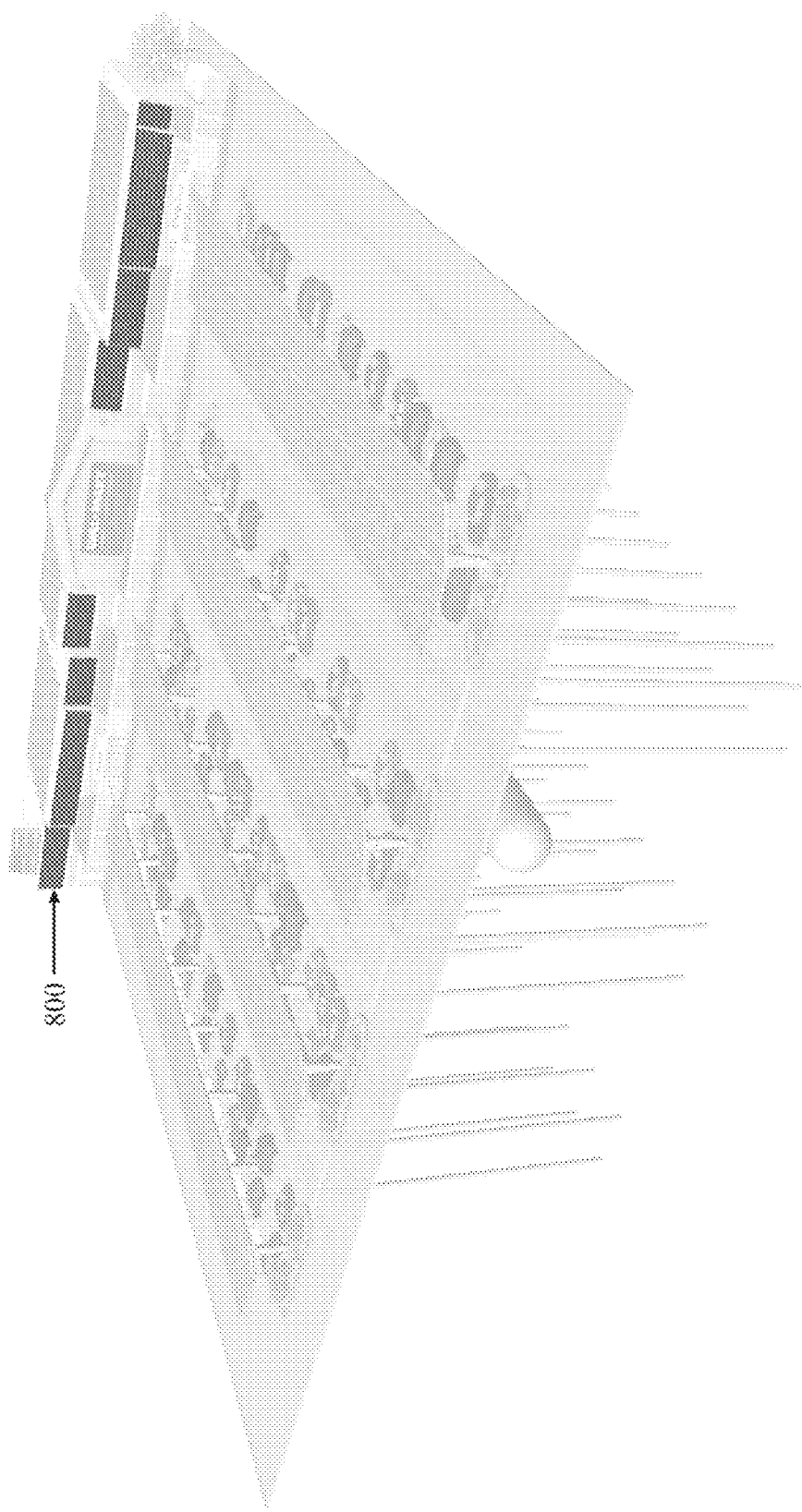
FIG. 8 is an illustrative example of a solar building structure that includes photovoltaic modules in accordance with some embodiments of the disclosed subject matter.

In some embodiments, the integrated renewable energy and asset system can also include photovoltaic modules 800 integrated within the exterior envelope of an adjacent building or structure as illustrated in FIG. 8. The photovoltaic modules can produce clean and renewable energy that can be utilized by the building they are integrated within or sold back directly to the grid. The building integrated photovoltaic modules can be highly visible and can attractively promote a company's commitment to sustainability. Part of the building's exterior material or the entire building's exterior material can be integrated with photovoltaic modules. For example, as shown in FIG. 8, windows or other portions of the building structure's exterior material can be replaced with photovoltaic modules that are connected to a storage system located adjacent to or attached to the building structure. In this example, the solar energy captured by the photovoltaic modules can be directed to a central inverter that converts the direct current output to an alternating current, which can then be adapted to provide power to portions of the building or components requiring power installed in the parking lot and/or sold to an electrical utility grid. In another example, the photovoltaic modules 800 can be connected to a controller that determines whether to supply power from photovoltaic modules 800 to an electrical utility grid, whether to supply power to the building structure on which photovoltaic modules 800 are placed, and/or whether to supply power to one or more components of the integrated renewable energy and asset system (e.g., video cameras, lighting, security alarms, displays, etc.).

Figure 9:
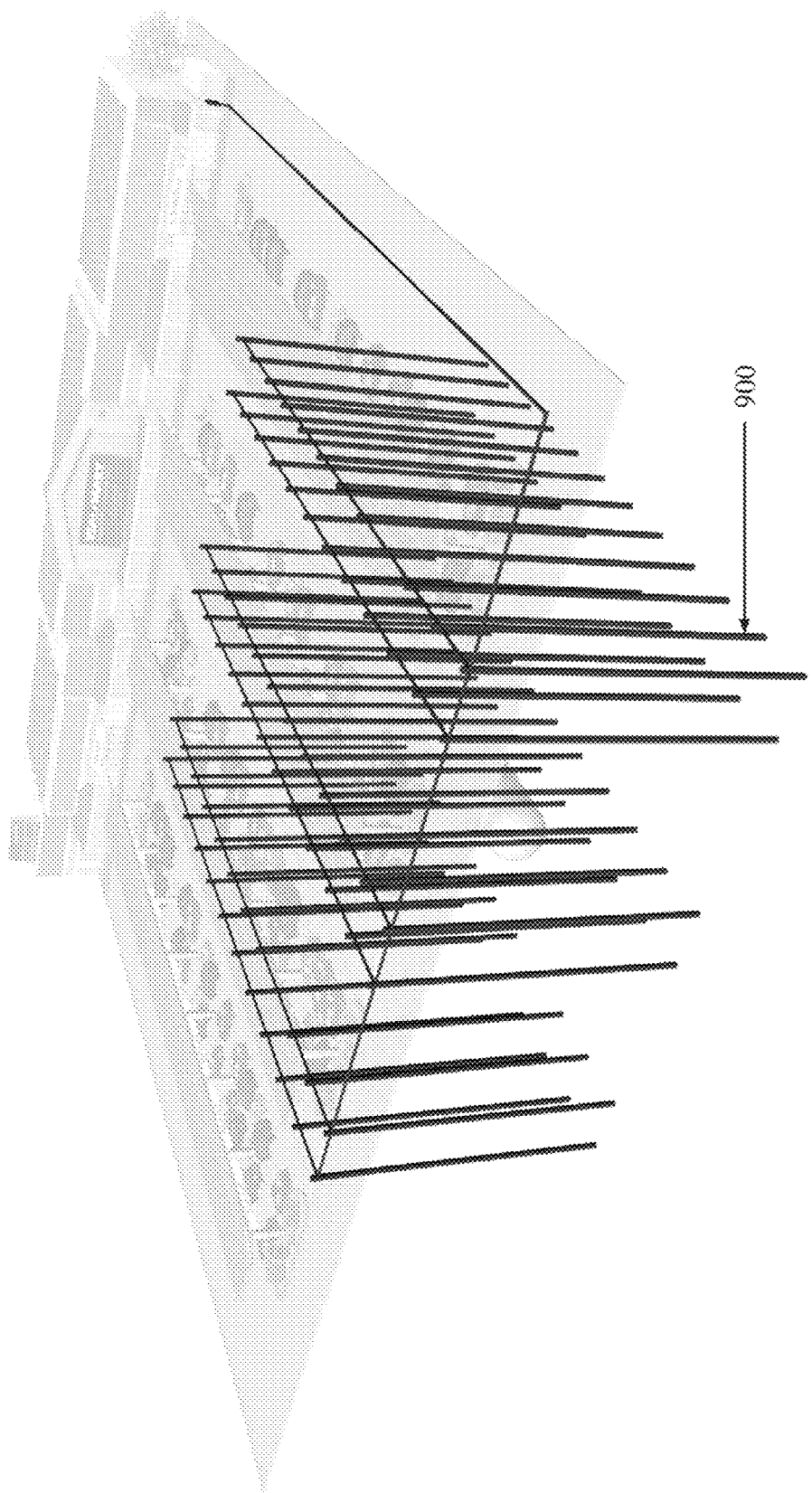
FIG. 9 is an illustrative example of a geothermal system that includes geothermal tubes placed beneath the parking lot and, in some embodiments, placed beneath the foundation of the vertical columns used to support the solar carport canopy in accordance with some embodiments of the disclosed subject matter.

In some embodiments, the integrated renewable energy and asset system can also include geothermal ground loops 900 that are installed underneath a parking lot or adjacent building as illustrated in FIG. 9. This geothermal system 900 can use the thermal energy generated and stored within the earth to produce renewable energy that can either be used on site or sold back to the utilities. For example, this system can be coupled with the photovoltaic technologies described herein to melt snow and ice onsite and off the photovoltaics. In a more particular example, the geothermal system can include solar thermal panels that use the thermal energy from the sun to produce renewable energy that is stored in any other suitable storage unit. In this example (where the geothermal tubes installed beneath the existing parking lot structure are connected to solar thermal tubes installed on the surface the solar canopy or solar parking structure), the thermal energy stored in the geothermal tubes can be directed through the geothermal heat pump and/or the storage unit to solar thermal tubes installed proximate to the solar canopy or solar parking structure to melt snow or other precipitation from the surface of the structure. In another example, the thermal energy stored in the geothermal tubes can be directed to heat traces installed beneath parking areas to, for example, melt snow from the surface of the parking areas or increase the ambient temperature of the parking areas. In yet another example, the thermal energy stored in the geothermal tubes can be directed to heat an adjacent building or heat water in a cistern or a water containment unit. In a further example, the solar thermal panels or thermal tubes can use the stored thermal energy captured from the sun to melt snow or other precipitation from the surface of the structure, melt snow from the surface of the parking areas, provide thermal energy to an adjacent building, heat water in a cistern or other storage tank, or increase the ambient temperature of a designated area in the parking lot.

In a more particular example, as shown in FIG. 9, the geothermal system 900 can include geothermal tubes that are installed beneath the surface of an existing parking lot, connections between the geothermal tubes that are installed in geothermal trenches, thermal tubes that are integrated with the photovoltaic modules (see FIG. 10), heating elements that are installed in the parking areas, a geothermal heat pump, and/or any other suitable thermal storage unit. The geothermal heat pump or the control system can then direct captured thermal energy to a particular portion of the building, to a particular portion of the parking lot (e.g., to heating elements installed on or beneath the pavement of a parking area), and/or to a component of the integrated renewable energy and asset system (e.g., to the surface of a carport canopy such that snow or ice is melted from the surface). It should be noted that the geothermal heat pump can be connected to any suitable storage unit capable of storing thermal energy.

In some embodiments, geothermal system 900 can be connected to a controller that determines whether to supply thermal energy from geothermal tubes to a particular portion of the parking lot, particular components installed on the parking lot, and/or a particular portion of the building (e.g., to generate hot water, melt snow on a particular area, etc.). This determination can be made in response to receiving sensor data. Such sensor data can include, for example, temperature information from the surface of the solar carport, video and/or imaging information from the surface of the solar carport (e.g., to identify that snow is falling on the carport structure), etc. In another example, sensor data can include water level information from a hot water tank connected to a building adjacent to the parking lot and, in response to determining that the water level is below a given threshold, the control system can direct geothermal system 900 to heat water in a cistern and direct the heated water to the hot water tank. In yet another example, the controller or control system can access web resources to determine, for example, weather-related information and, in response to determining that the location of the solar carport is likely to receive snow, ice, or precipitation, the controller can direct the thermal energy to particular portions of the integrated renewable energy and asset system (e.g., heated walkways, hot water systems, pre-heating the surface of the solar carports, etc.).

Figure 10:
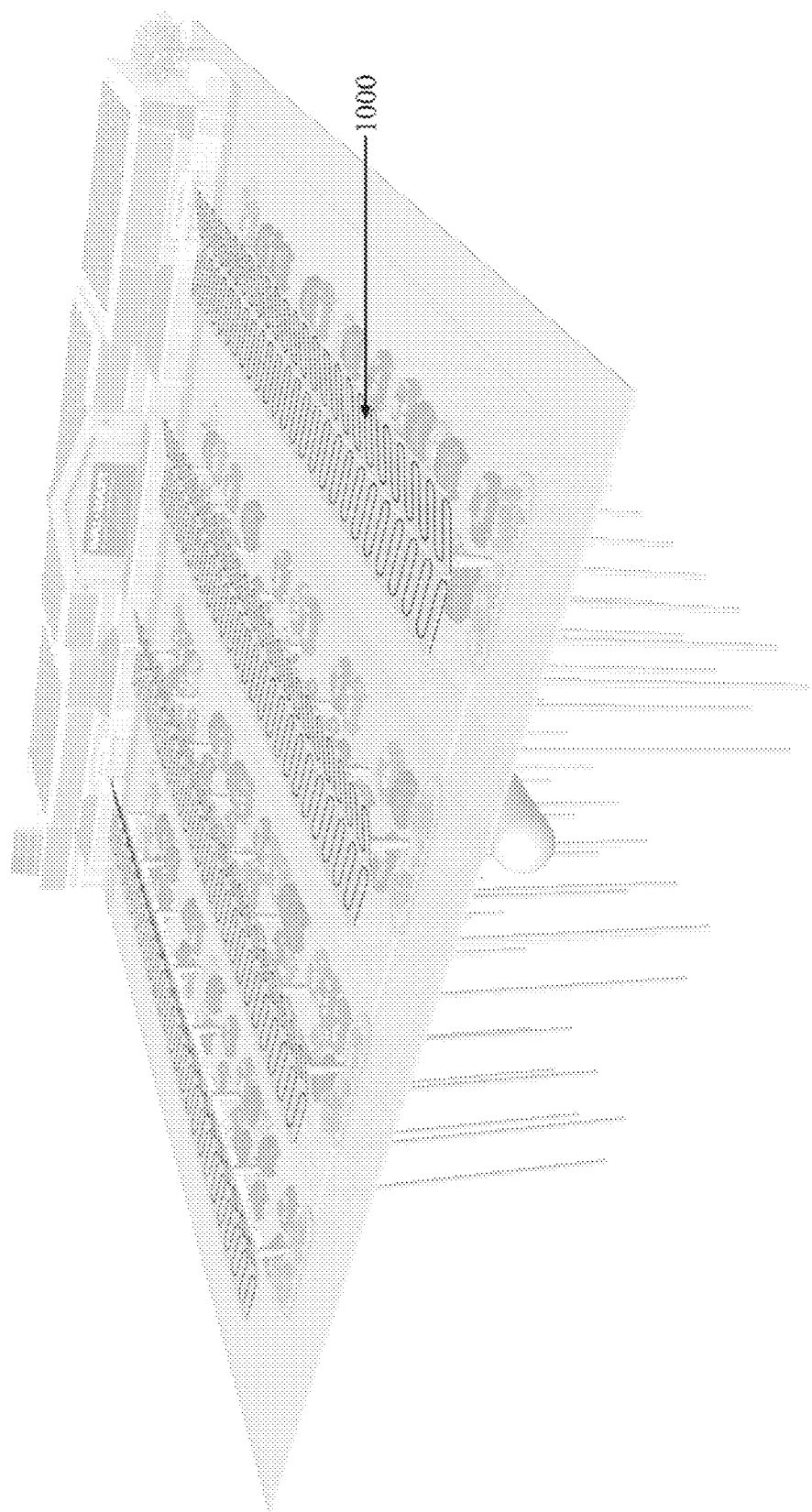
FIG. 10 is an illustrative example of thermal tubing integrated into a solar carport canopy in accordance with some embodiments of the disclosed subject matter.

In some embodiments, the integrated renewable energy and asset system can also include solar thermal tubes as illustrated in FIG. 10. In this particular example, the solar thermal tubes can be integrated within the roof of the parking canopy structure. It should be noted that, although the embodiments described herein show that the solar thermal tubes are integrated within the roof of a parking canopy, this is merely illustrative. The solar thermal tubes can be placed in any suitable location. This integrated technology can, for example, harness the sun's thermal energy to produce steam and hot water that can be utilized by a building or sold to the utilities. In some embodiments, this system can be coupled with the photovoltaic technologies described herein to melt snow and ice onsite and off the photovoltaics. For example, as mentioned above, the solar thermal tubes can be connected to a controller that determines whether to direct thermal energy from the geothermal tubes or any other suitable storage unit to the solar thermal tubes for producing steam, producing hot water, increasing the ambient temperature of a particular area, melting snow and ice from a particular area (e.g., the surface of the solar canopy structure). In a more particular example, one or more temperature sensors can be attached to particular portions of the integrated renewable energy and asset system (e.g., the top surface of the solar carport structure, a parking area, the solar thermal tubes, etc.), where the controller can receive temperature information from the sensors to determine when thermal energy is sent from geothermal tubes or any other suitable storage unit to the solar thermal tubes in the solar carport structure (e.g., to melt snow and/or ice) or to the solar traces beneath a parking area (e.g., to melt snow and/or ice, to increase the ambient temperature above a parking area, etc.).

Figure 11:
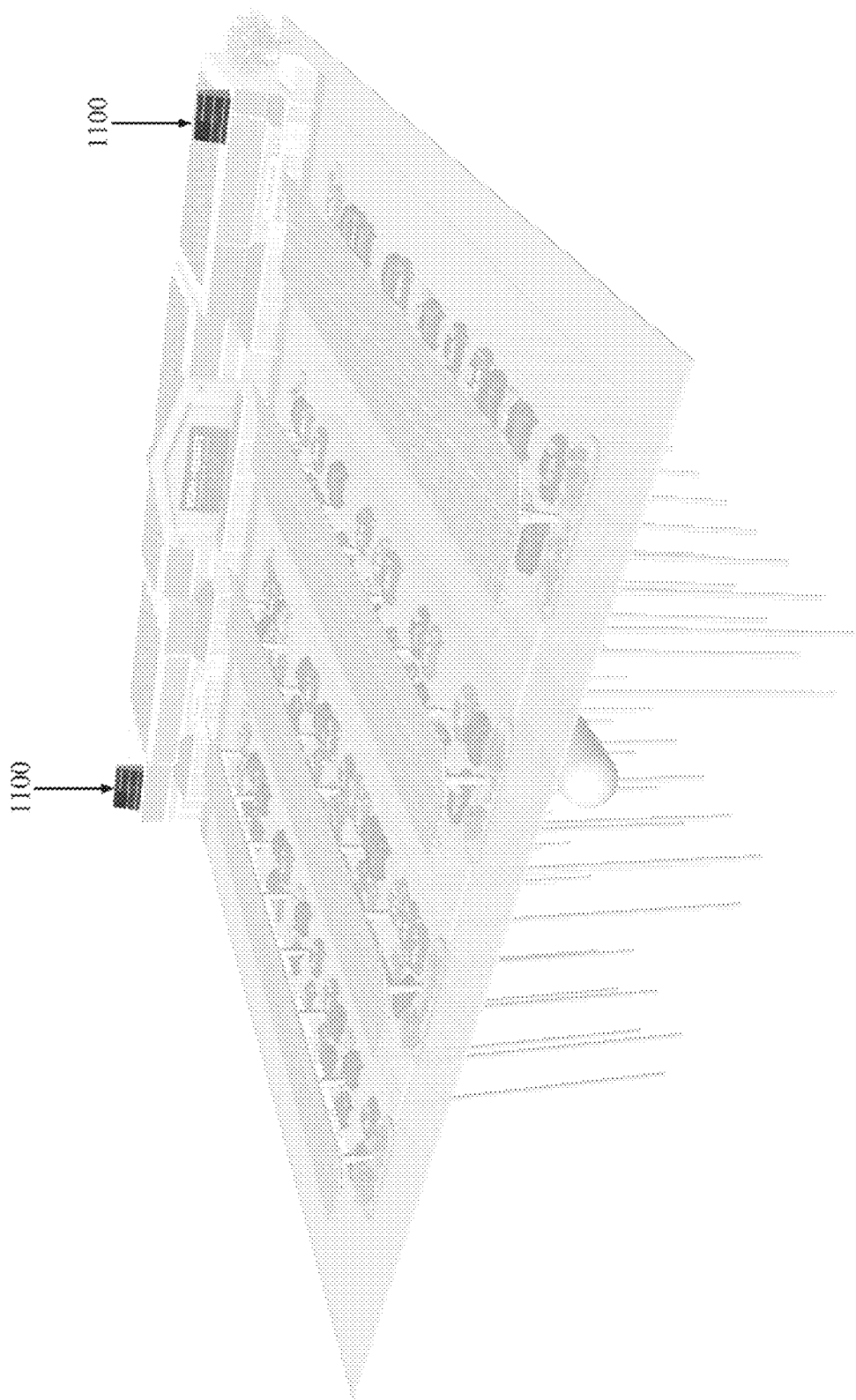
FIG. 11 is an illustrative example of a solar flag structure that includes photovoltaic modules in accordance with some embodiments of the disclosed subject matter.

In some embodiments, the integrated renewable energy and asset system can also include advertisement or branding billboards and flags 1100 that have integrated photovoltaic modules or cells as illustrated in FIG. 11. These billboards and flags 1100 can be installed, for example, anywhere near the parking lot or directly on the building. The integrated photovoltaic modules can produce clean and renewable energy that can be utilized by a building or sold back directly to the grid. The tilt angle of the modules can be flexible and depend on the specific geographic location of the building. These and other advertisement or branding billboards and flags that have integrated photovoltaic modules are further described for example, in commonly-owned, commonly assigned U.S. patent application Ser. No. 12/497,392, filed Jul. 2, 2009, and U.S. patent application Ser. No. 12/497,461, filed Jul. 2, 2009, which are incorporated by reference herein in their entireties.

Similar to the other photovoltaic modules described herein, the photovoltaic modules installed as part of an advertisement or branding billboard or flag can be connected to an inverter that is adapted to supply power from the photovoltaic modules to an electrical utility grid. In another example, the photovoltaic modules installed as part of an advertisement or branding billboard or flag can be connected to a controller that determines whether to supply power from the photovoltaic modules to an electrical utility grid, whether to supply power to the building structure on which the advertisement or branding billboard or flag is placed, and/or whether to supply power to one or more components of the integrated renewable energy and asset system (e.g., video cameras, lighting, security alarms, displays, etc.).

Figure 12:
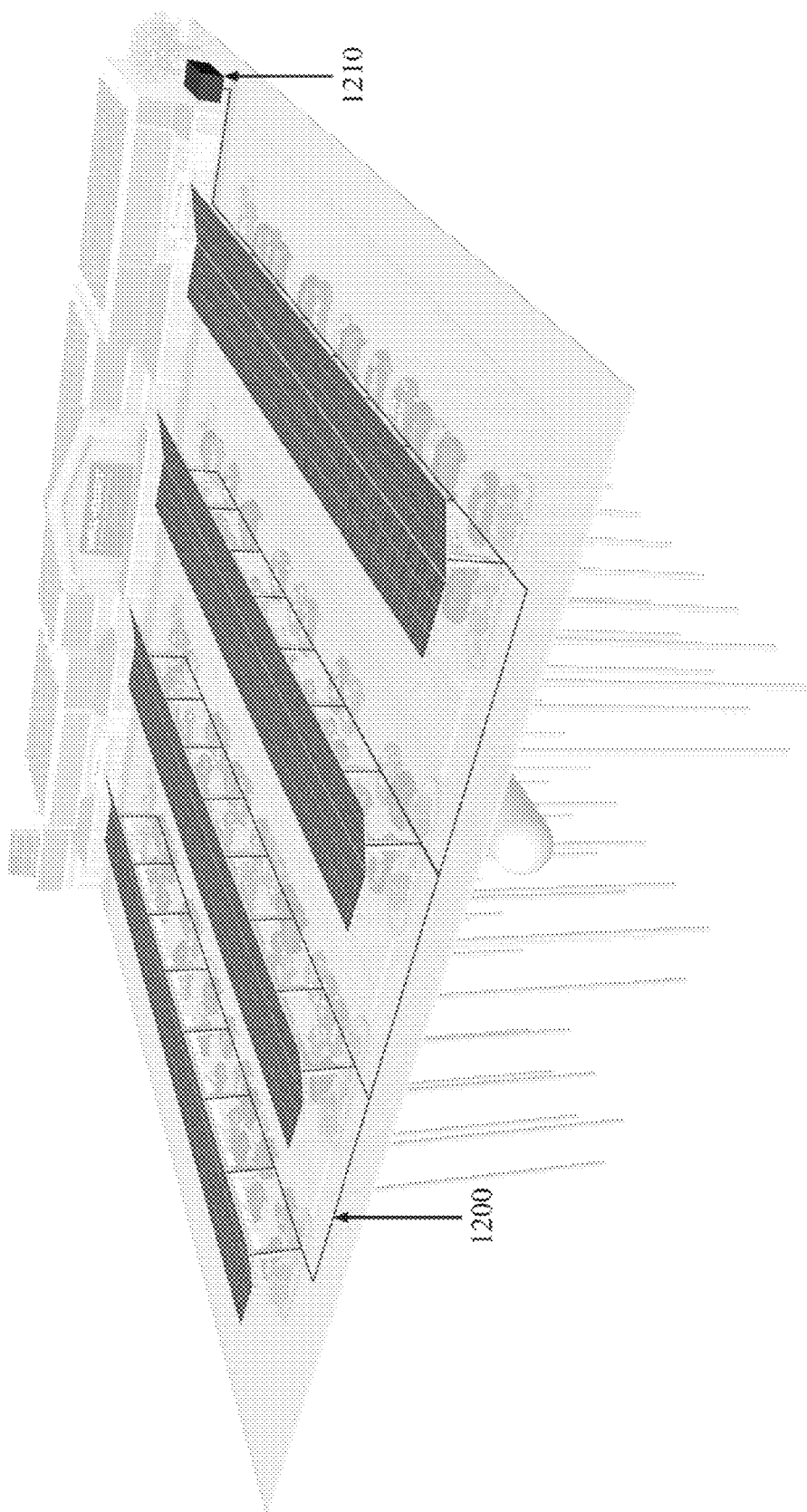
FIG. 12 is an illustrative example of a power transmission system of the integrated renewable energy and asset system in accordance with some embodiments of the disclosed subject matter.

In some embodiments, a storage system 1200 that includes a battery or storage unit 1210 can also be installed as part of the integrated renewable energy and asset system as illustrated in FIG. 12. The storage system 1200 can collect the produced energy from the various photovoltaic technologies described herein. The stored energy can either be utilized by a building directly on site or sold back to the grid.

In a more particular example, when installing the support columns in the parking lot, connectors from the solar panels on the roof of the solar canopy structure can be placed through each support column and connected beneath the parking lot, where the multiple power lines can be connected to battery or storage unit 1210. As shown in FIG. 12, power transmission lines can be placed beneath the parking lot structure to connect each of the photovoltaic modules supported by each vertical column structure and can direct inbound electricity to battery or storage unit 1210. In some embodiments, battery or storage unit 1210 can be connected to a controller or control system that determines whether to supply power from battery or storage unit 1210 to an electrical utility grid, whether to supply power to the building structure or other building structures connected to battery or storage unit 1210, and/or whether to supply power to one or more components of the integrated renewable energy and asset system (e.g., video cameras, lighting, security alarms, displays, etc.). In a more particular example, a sensor can be attached to battery or storage unit 1210 or an inverter that detects energy production levels. The controller or any other suitable processor can receive energy production levels from the electric inverter to determine whether energy is directed to one or more components on the integrated renewable energy and asset system (e.g., lighting, vehicle charging, battery charging, LED display screens, video monitoring equipment, etc.), to the adjacent building, and/or to an electrical utility grid.

In another more particular example, a micro-inverter, combiner boxes, and/or sub-combiner boxes can be mounted to a vertical support column, where the micro-inverter converts the direct current output from a particular photovoltaic solar panel (e.g., the one supported by the support column) into an alternating current. The wiring in the integrated renewable energy and asset system can direct the output from each of the micro-inverters to an energy storage unit. Additionally or alternatively, the micro-inverter can charge a battery or other suitable storage unit that is located on or near the vertical support column. The control system can determine whether the micro-inverter should charge the battery or direct the captured energy to a central inverter that is connected to an energy storage unit (e.g., which can be connected to a utility grid or a building adjacent to the parking lot having the photovoltaic modules).

Additionally or alternatively, a combiner box can be positioned within the parking lot to receive the direct current from each of the photovoltaic modules and transmit the direct current to a central inverter that converts the direct current to alternating current for delivery to a utility grid, the building structure, and/or a component of the integrated renewable energy and asset system.

Figure 13:
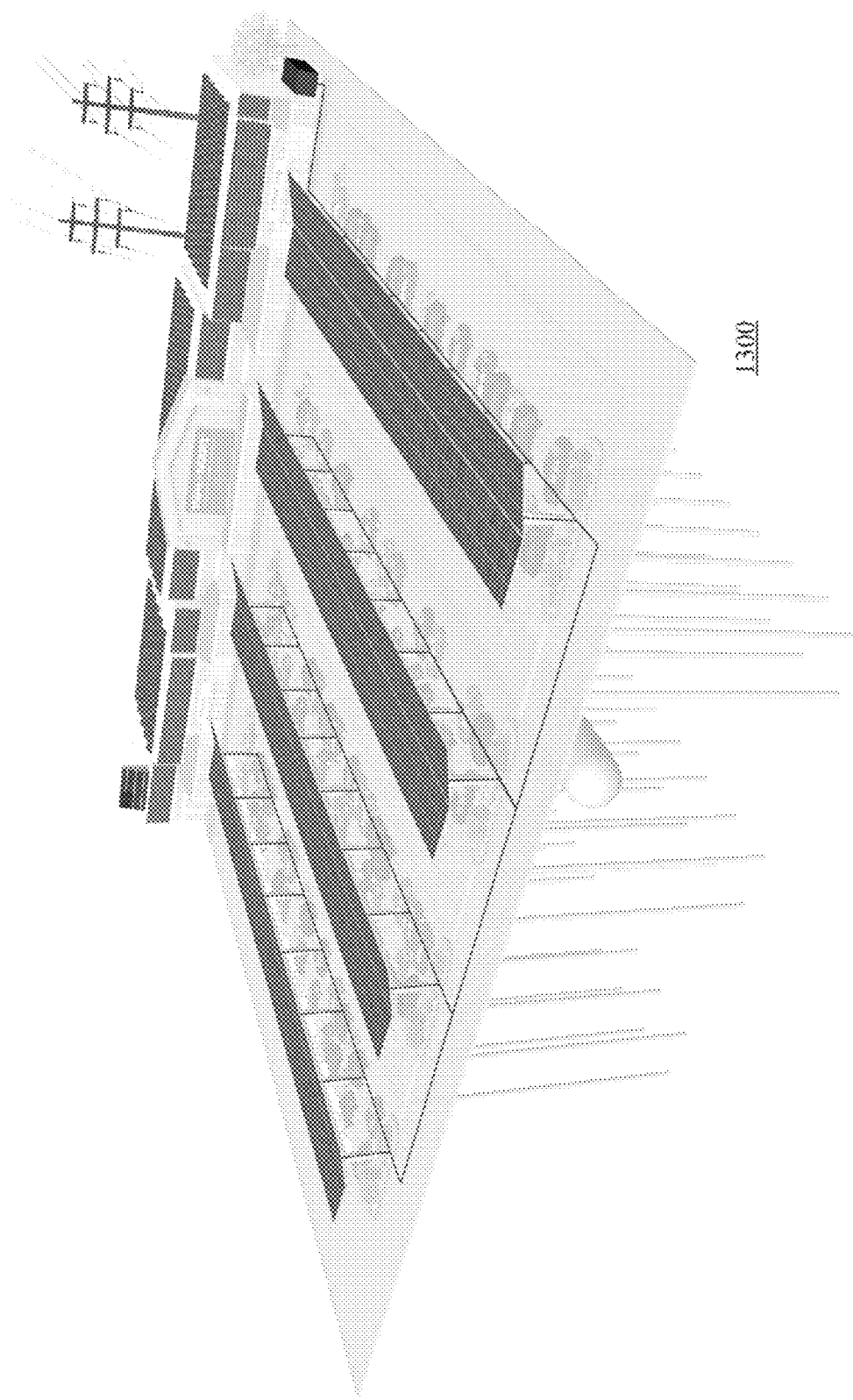
FIG. 13 is an illustrative example of a grid resiliency system of the integrated renewable energy and asset system in accordance with some embodiments of the disclosed subject matter.

In some embodiments, a grid resiliency system 1300 utilized in conjunction with the photovoltaic and storage technologies described herein can also be installed as part of the integrated renewable energy and asset system as illustrated in FIG. 13. This type of system can include a controller or any other suitable processor that works in conjunction with the energy demand of a local utility grid. For example, during a utility grid's peak demand, a signal can be sent to the grid resiliency system and the grid resiliency system or the control system can immediately respond to provide the backup energy needed for stabilization. Alternatively, in response to the utility grid not needing support from the integrated renewable energy and asset system, the controller can supply power to other portions of the integrated renewable energy and asset system (e.g., video cameras, lighting, security alarms, displays, etc.).

Figure 14:
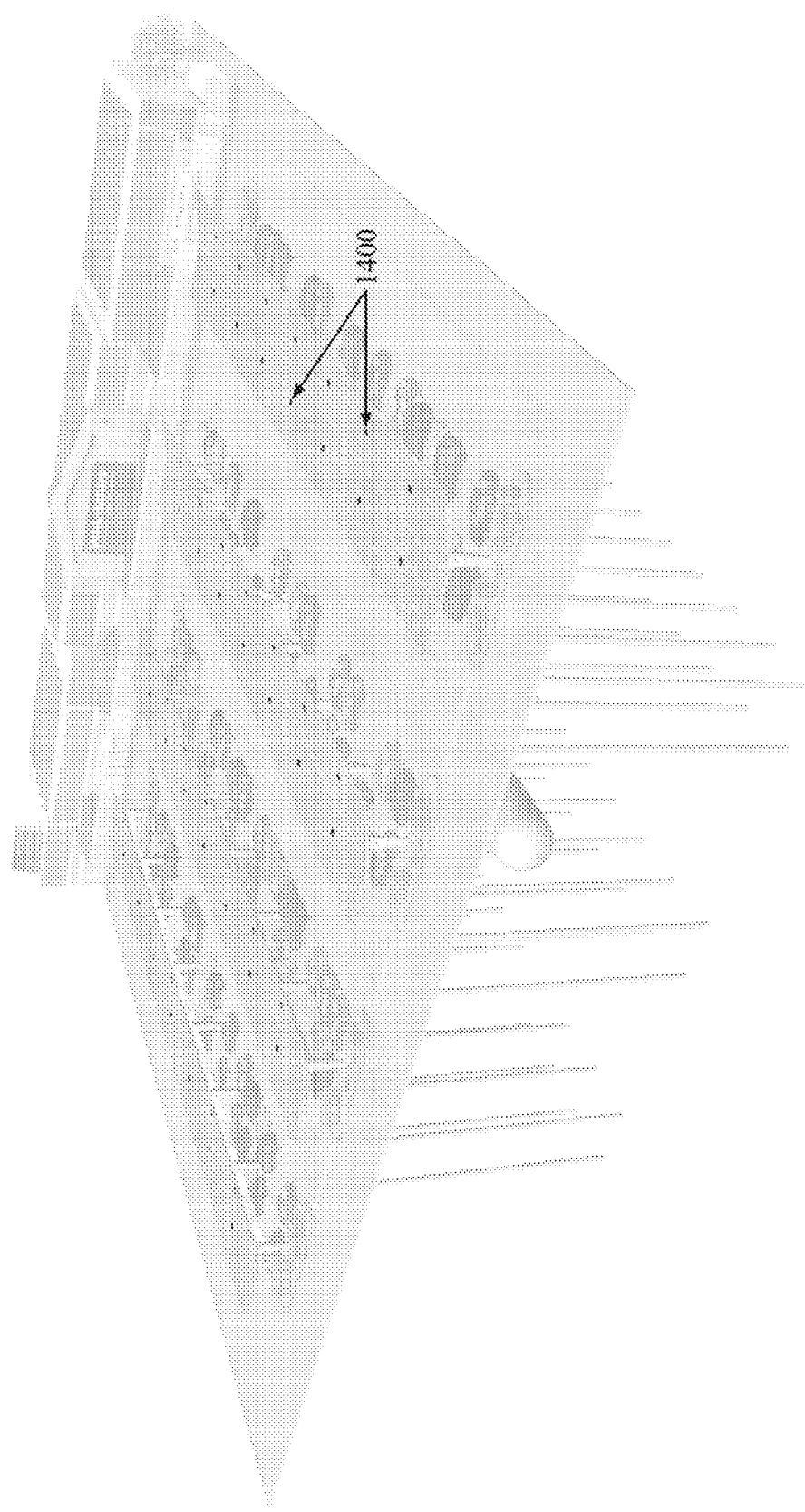
FIG. 14 is an illustrative example of a lighting system of the integrated renewable energy and asset system in accordance with some embodiments of the disclosed subject matter.

In some embodiments, the integrated renewable energy and asset system can also include an exterior lighting system as illustrated in FIG. 14. In FIG. 14, a motion sensor LED lighting system is depicted in this example. This type of system can provide a parking lot or exterior of a building with lighting only during times when illumination is needed. The integrated sensor can detect when either a car or person is in the immediate vicinity and can illuminate the light fixture to a higher level. This type of system can, for example, reduce energy use and can lower utility bills. It can also provide a parking lot or exterior building with enhanced site security. As illustrated in FIG. 14, such lighting fixtures of the exterior lighting system can be integrated with the canopy of the parking carport. It should be noted that, although the embodiments described herein show that the lighting fixtures are integrated with the canopy of the parking carport, this is merely illustrative and the lighting fixtures can be placed in any suitable location. For example, additionally or alternatively, the lighting fixtures can be placed at other locations of the parking carport or building or on other areas near a parking lot or building.

It should be noted that various other types of lighting systems and technologies can also be utilized. It should also be noted that, in some embodiments, the external lighting system can be powered by either the energy produced by the photovoltaic technologies of the disclosed invention or by the utility grid. For example, in response to receiving sensor data that indicates a person or car is present beneath a lighting system mounted to a solar carport, the controller connected to the lighting system can supply power from an energy storage unit to other portions of the integrated renewable energy and asset system (e.g., the particular lights along with associated security alarms and video cameras).

Figure 15:
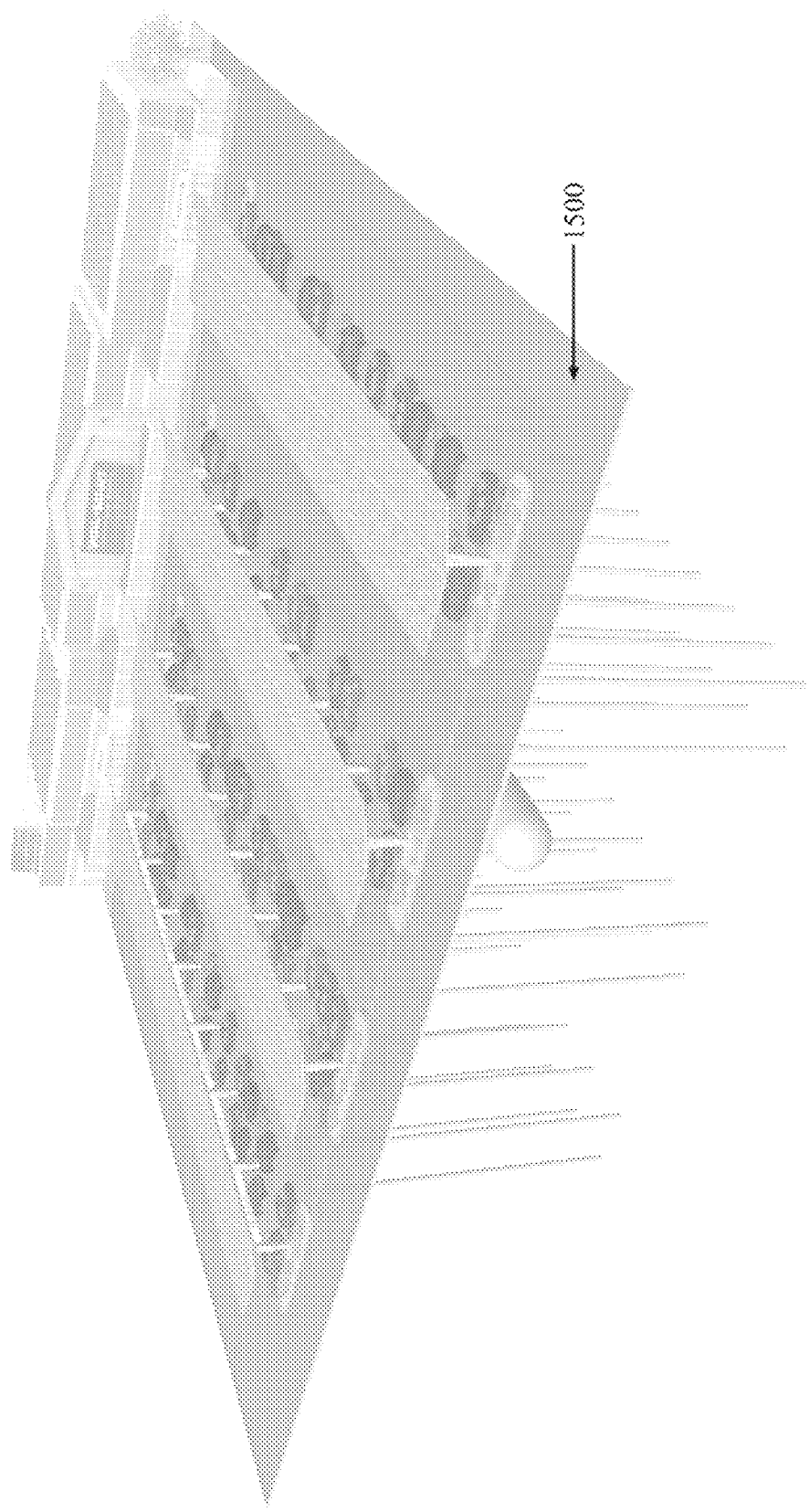
FIG. 15 is an illustrative example of eco-pavement being included in the integrated renewable energy and asset system in accordance with some embodiments of the disclosed subject matter.

In some embodiments, the integrated renewable energy and asset system can also include an eco-pavement 1500 as illustrated in FIG. 15. Typical parking lots and surfaces are often made with asphalt or concrete. These materials absorb the sun's thermal energy and radiate that heat to nearby cars and buildings. As such, this places extra heat loads on buildings and cars that need higher levels of air conditioning for mitigation. Eco-pavement surfaces 1500 can, for example, reduce this heat island effect and promote lower energy consumption of nearby cars and buildings. They can also be pervious, which can provide less demand on waste water treatment facilities.

Figure 16:
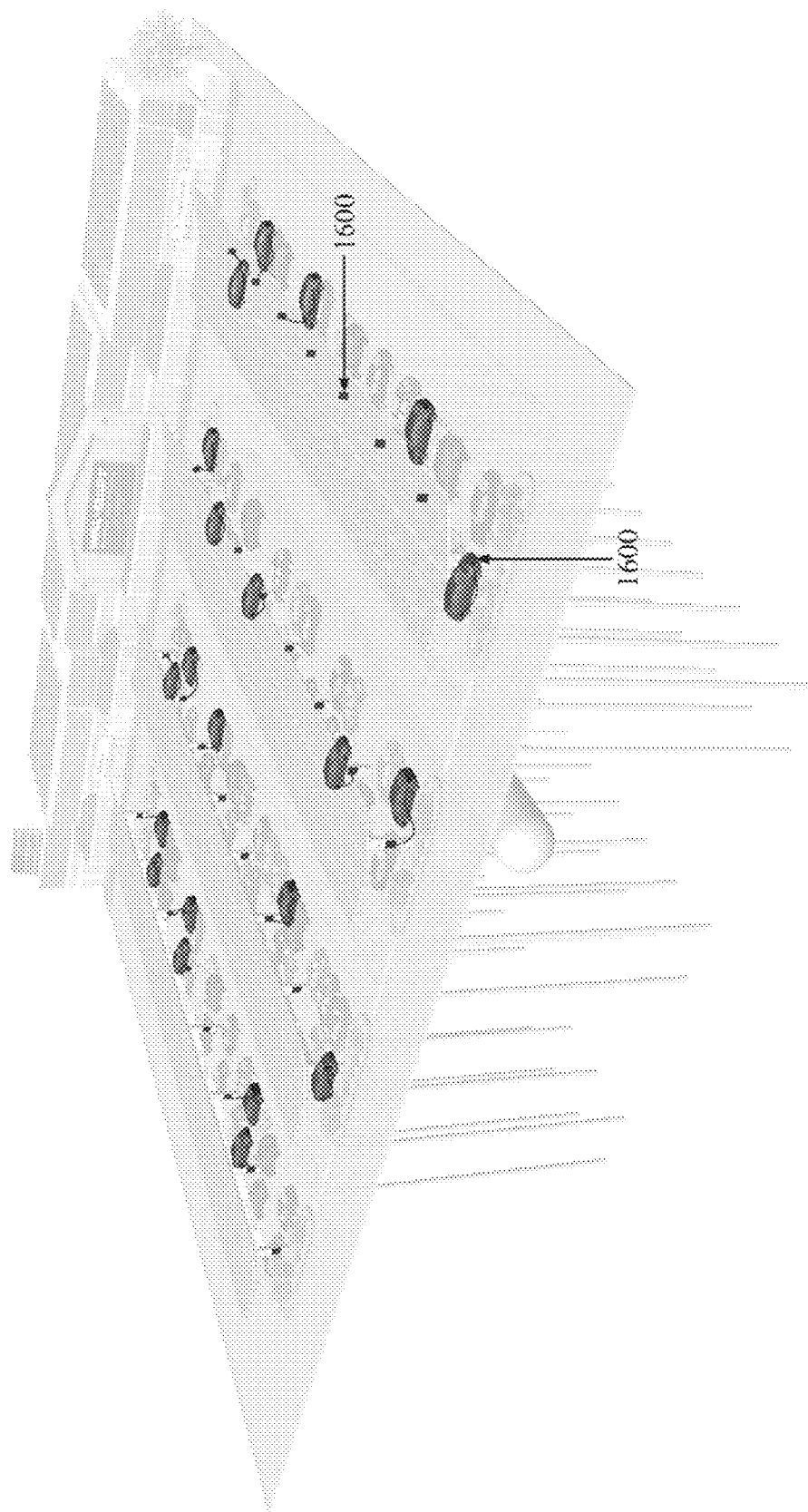
FIG. 16 is an illustrative example of a vehicle charging system of the integrated renewable energy and asset system in accordance with some embodiments of the disclosed subject matter.

In some embodiments, electric vehicle charging stations 1600 can also be installed as part of the integrated renewable energy and asset system as illustrated in FIG. 16. These charging stations 1600 can, for example, be installed directly on the parking carport's vertical support columns. Additionally or alternatively, these charging stations 1600 can be located in other areas near a parking lot or building as well. An electric vehicle can park near the charging station and attach directly to it. The car can re-charge as necessary for either a cost depicted by the building or parking lot owner or for no cost. The energy provided to the charger can either be supplied directly by the photovoltaic technologies described herein or by the utility grid.

In some embodiments, each of the electric vehicle charging stations 1600 that are mounted to a vertical support column can be connected to a control system or other suitable processor. In response to detecting that a vehicle capable of being charged by charging station 1600, the control system can direct electrical energy from a storage unit to the particular charging station 1600 in use. Alternatively, the control system or controller can direct electrical energy from a micro-inverter that is also mounted or integrated with the vertical support column that supports an array of photovoltaic modules to the particular charging station 1600.

Figure 17:
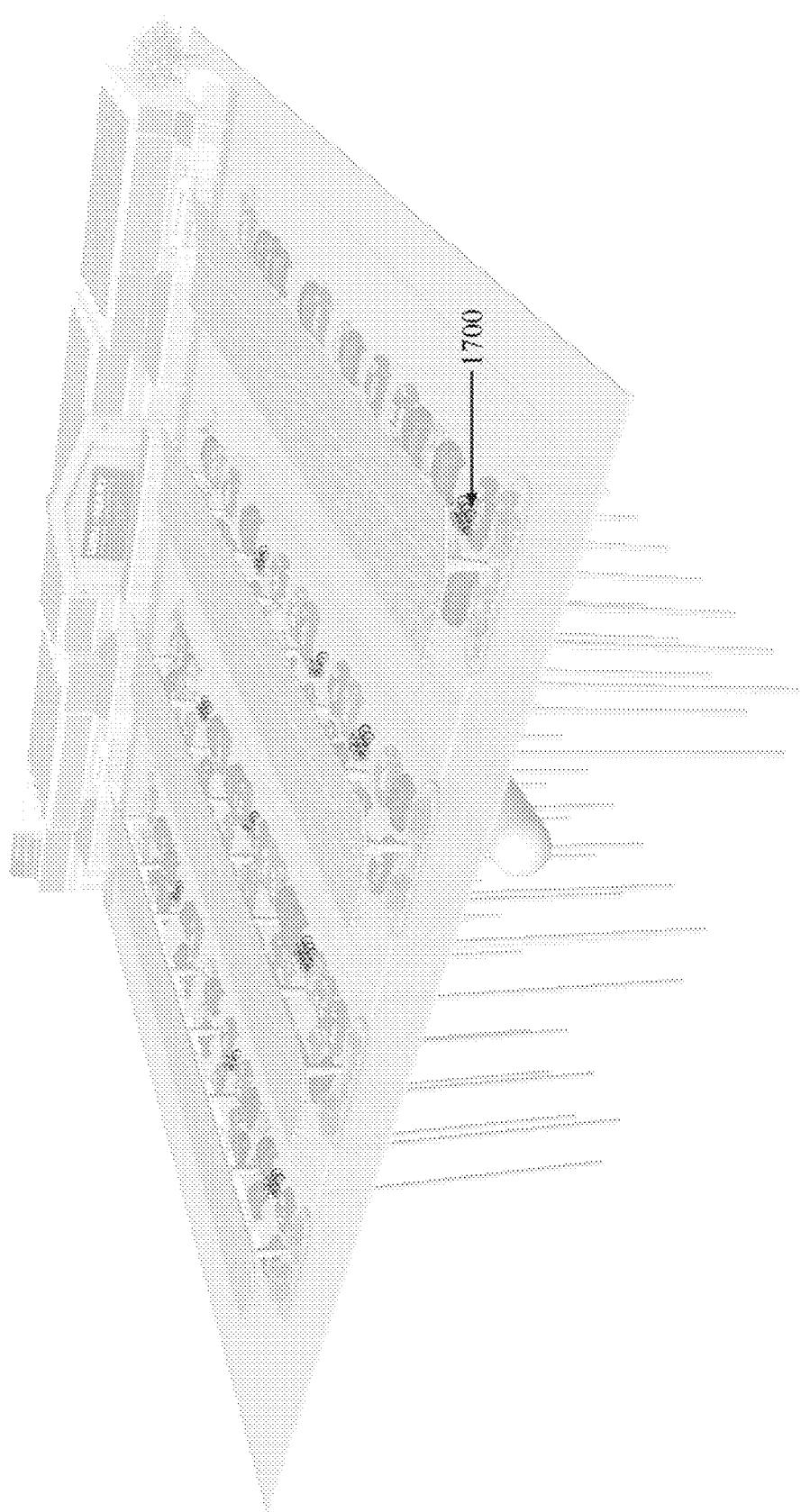
FIG. 17 is an illustrative example of a bicycle parking system of the integrated renewable energy and asset system in accordance with some embodiments of the disclosed subject matter.

In some embodiments, the integrated renewable energy and asset system can include mechanisms for bicycle parking as illustrated in FIG. 17. For example, a bike rack or any other suitable bicycle parking can be installed in a designated space under the parking canopy shown in FIG. 6 or can also be installed in any other suitable location (e.g., near the parking lot or building).

Figure 18:
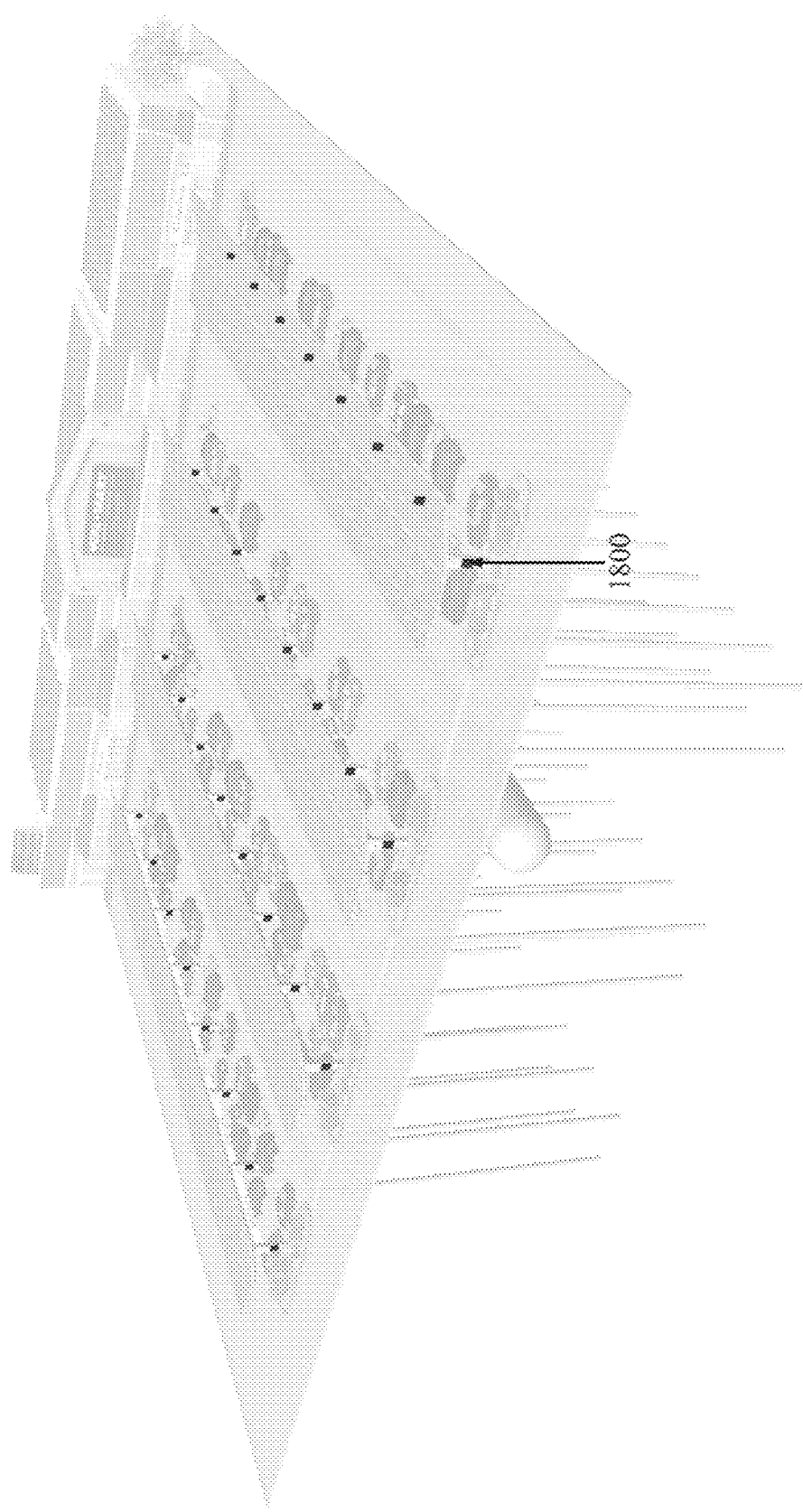
FIG. 18 is an illustrative example of a storage system of the integrated renewable energy and asset system in accordance with some embodiments of the disclosed subject matter.

In some embodiments, the integrated renewable energy and asset system can also include tire pump storage 1800 as illustrated in FIG. 18. Maintaining proper car tire pressure can reduce fuel use, thereby providing owners with longer lasting tires, enhancing vehicle handling, and helping to prevent accidents. Additionally, they can promote clean and sustainable transportation for bicycle riders.

Figure 19:
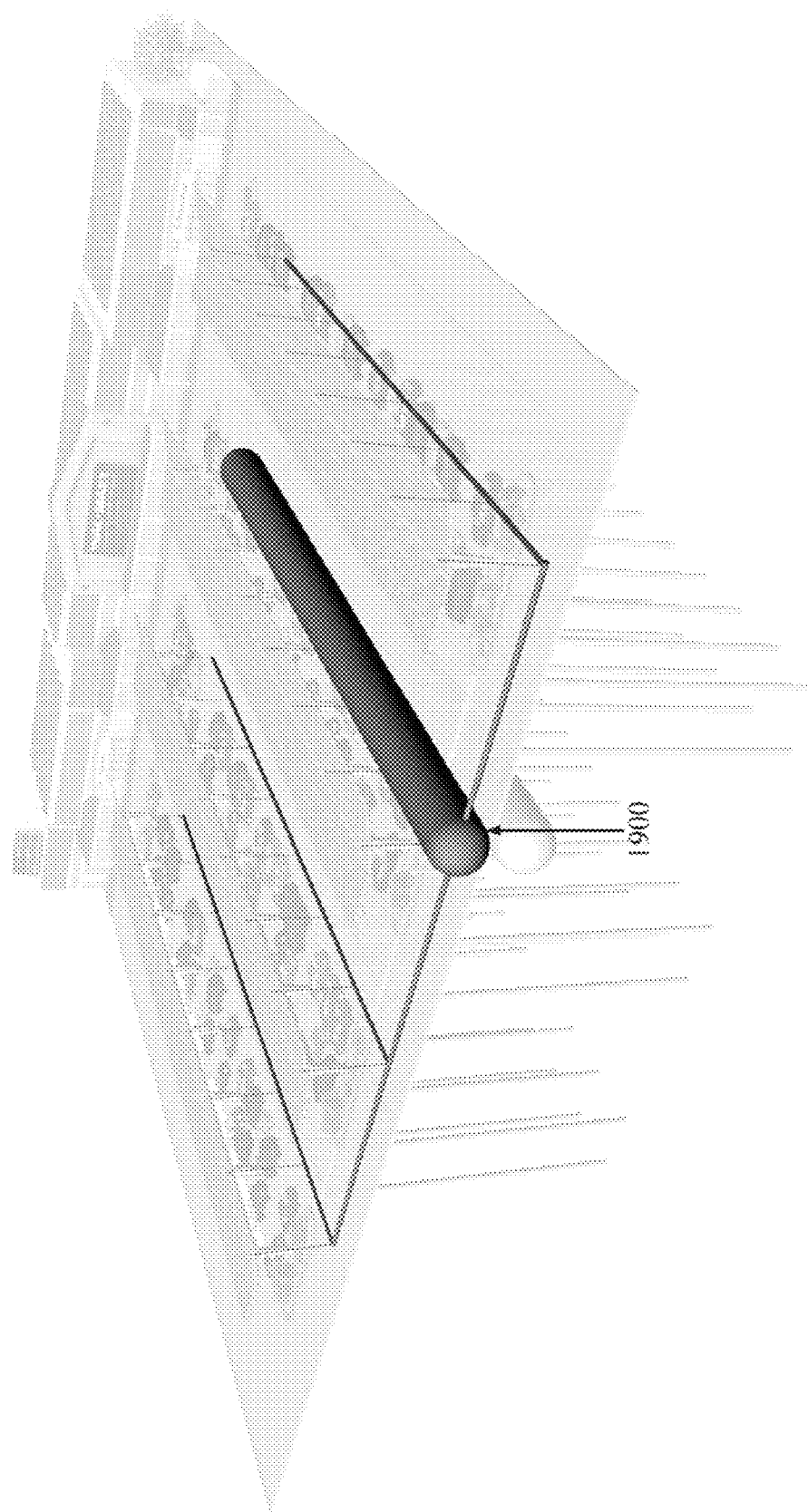
FIG. 19 is an illustrative example of a potable water collection system of the integrated renewable energy and asset system in accordance with some embodiments of the disclosed subject matter.

In some embodiments, a potable water collection system 1900 can also be installed and integrated as part of the integrated renewable energy and asset system disclosed herein as illustrated in FIG. 19. In this particular example, water cisterns 1900 can be placed under the parking lot that catch the water that falls on top of the parking carports. It should be noted, however, that any other suitable catchment approaches can be used in other locations under, above, or near the parking lot or building. In some embodiments, a filtration device can also be utilized with this system. The water can either be stored and used directly in a building or transported off site.

Figure 20:
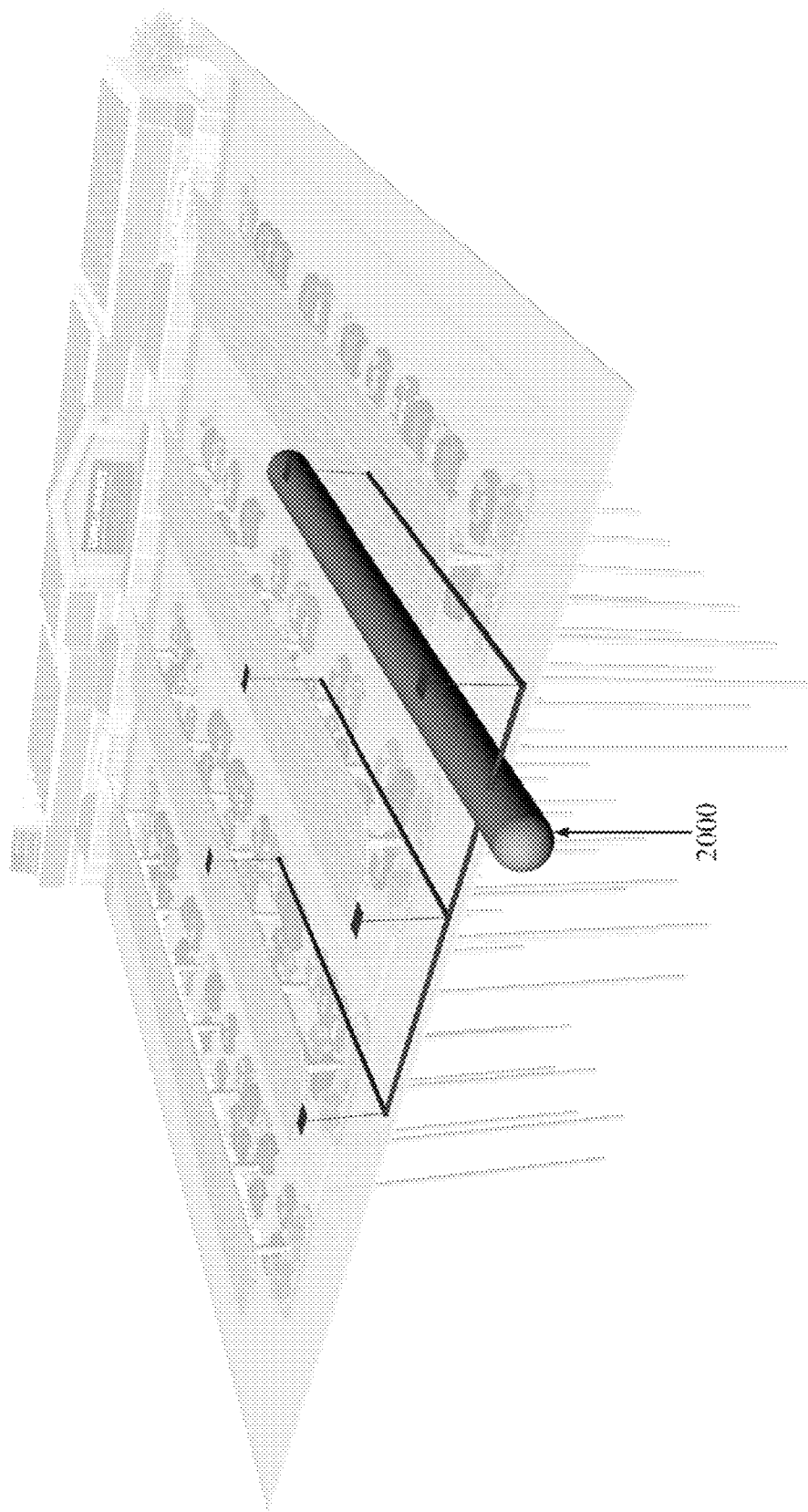
FIG. 20 is an illustrative example of a grey water collection system of the integrated renewable energy and asset system in accordance with some embodiments of the disclosed subject matter.

In some embodiments, a grey water collection system 2000 can also be installed and integrated as part of the integrated renewable energy and asset system described herein as illustrated in FIG. 20. In this particular example, water cisterns 2000 can be placed under the parking lot that catch the water that falls on top of the parking lot surface. It should be noted, however, that any other suitable catchment approaches can be used in other locations under, above, or near the parking lot or building. In some embodiments, a filtration device can also be utilized with this system. The water can either be stored and used directly inside or outside a building (e.g., for irrigation) or transported off site.

In some embodiments, the cisterns and water transportation pipes used in potable water collection system 1900 and grey water collection system 2000 can be installed at the same time as installing the vertical support columns for the solar parking structure. For example, as shown in FIG. 19, a cistern can be placed beneath the surface of the parking lot, where water that falls on the surface of the solar parking structure flows down through the vertical support column and into water pipes that are connected to the cistern. It should be noted that when drilling bore holes into the parking lot, the geothermal tubes can be inserted beneath the cistern and any water pipes used to transport water to and from the cistern. For example, as shown in FIGS. 28 and 29, when fabricating the structural framework in an existing parking lot, water pipe trenches containing water pipes can be placed that connect to each of the vertical columns and direct the captured water to a cistern. Alternatively, some or all of the captured water can be directed to a water tank or other storage unit (e.g., that can be used by the building adjacent to the parking lot).

In some embodiments, sensors can be used to provide water level and/or usage data to a controller. For example, a sensor can be connected to a water tank that supplies water to a building adjacent to the parking lot. In response to receiving sensor data that indicates the water in the water tank is lower than a given threshold amount, the controller can direct water from the cistern in potable water collection system 1900 to the water tank corresponding to the building. In another example, the controller can also direct water from the cistern in grey water collection system 2000 to any suitable storage unit (e.g., a corresponding water tank).

Additionally or alternatively, in some embodiments, the cisterns used in potable water collection system 1900 and grey water collection system 2000 can be thermally connected to a geothermal system, such as geothermal system 900 of FIG. 9. For example, the thermal energy captured by the components of the geothermal system can be directed to one or more cisterns for heating the water stored in the cisterns. It should be noted that any suitable number of cisterns can be provided. For example, a first cistern can be connected to multiple geothermal tubes where this portion of the geothermal system can heat the water stored in the first cistern, a second cistern can be connected to multiple solar thermal tubes where this portion of the geothermal system can heat the water stored in the second cistern, a third cistern in fluid communication with the first cistern and the second cistern can be used to collect and/or combine water from the first cistern and the second cistern. In this example, the water from the third cistern can be filtered and directed to the hot water tank associated with the adjacent building.

Figure 21:
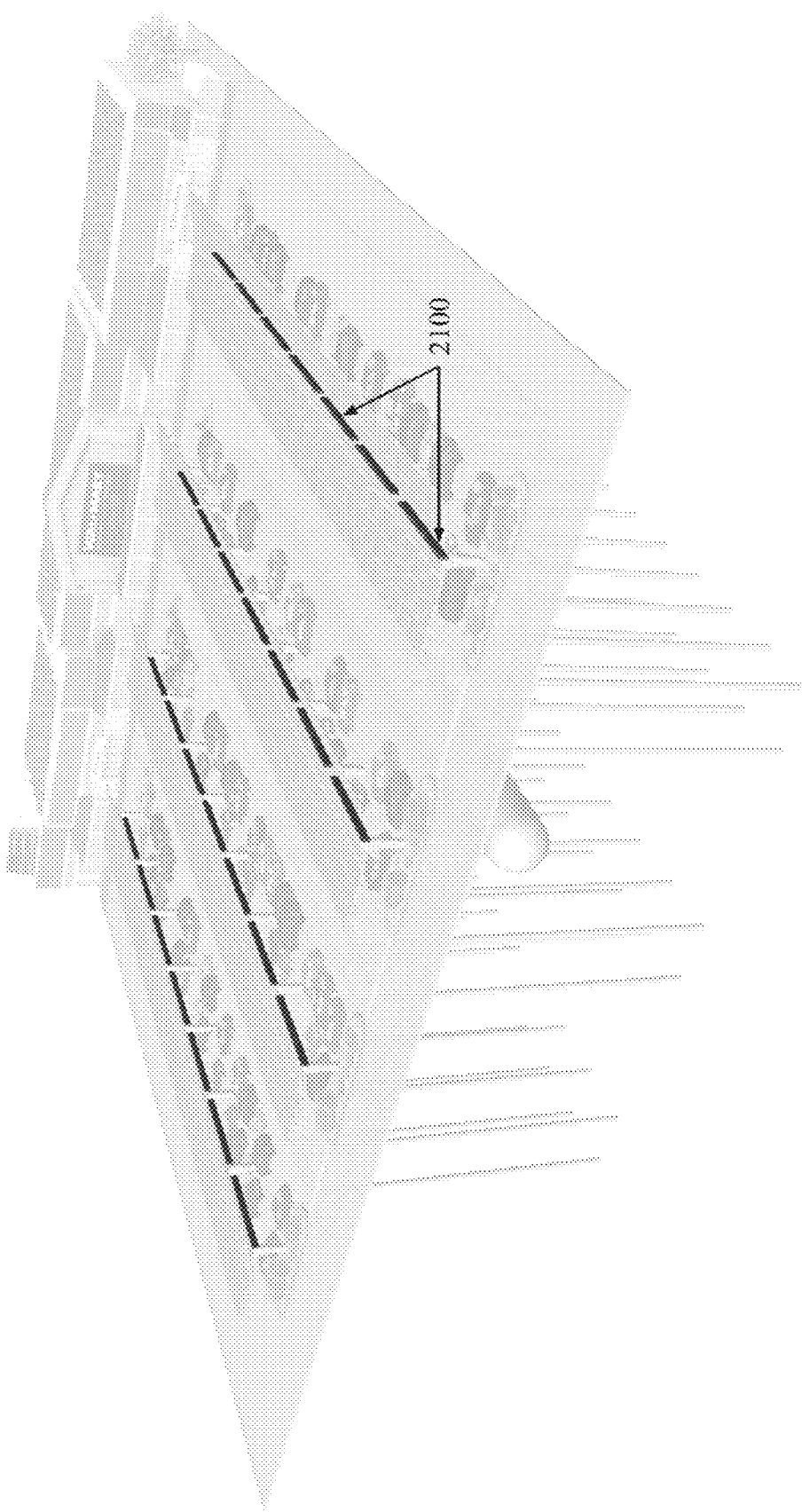
FIG. 21 is an illustrative example of an advertising system positioned as part of the solar carport structure in accordance with some embodiments of the disclosed subject matter.

In some embodiments, the integrated renewable energy and asset system can also include surfaces 2100 for advertisement or other visual messaging as illustrated in FIG. 21. In this particular example, the surfaces are located on the parking carport below the canopy. However, this is merely illustrative and such surfaces can be located in other areas near the parking lot or building. Technologies, such as LED screens, prints, banners, and murals can be attached or projected to these surfaces. LED screens can be dynamic and change frequently or be static. Furthermore, the LED screens can be synchronized with smart phones and change the advertisement or messaging according to a visitor's preferences.

Figure 22:
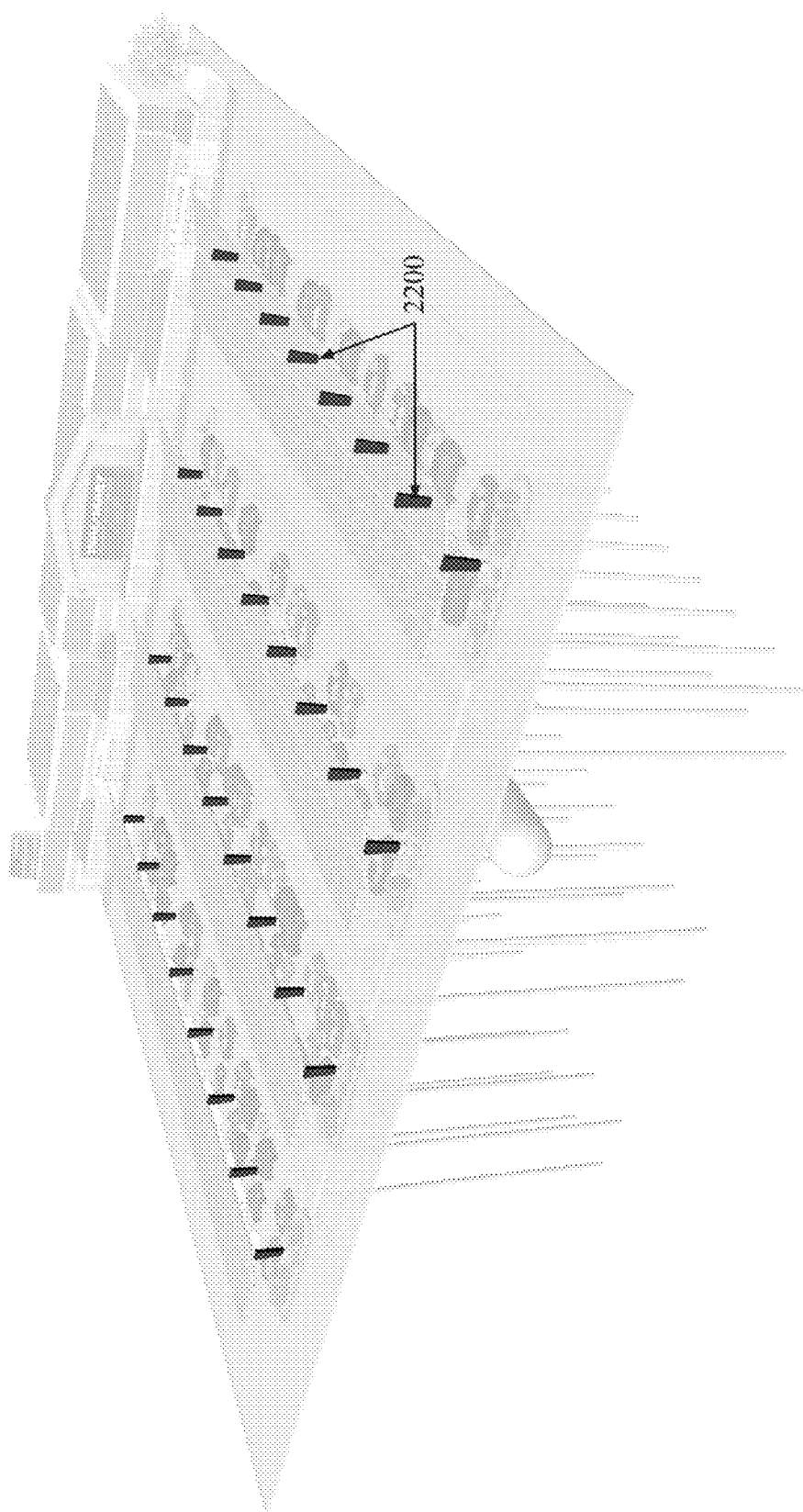
FIG. 22 is an illustrative example of a column cover that includes advertising or branding in accordance with some embodiments of the disclosed subject matter.

In some embodiments, the integrated renewable energy and asset system can also include surfaces 2200 for branding or other visual identity marketing as illustrated in FIG. 22. In this particular example, the surfaces can be located on the parking carport's columns. However, this is merely illustrative and such surfaces can be located in other areas near the parking lot or building. Technologies such as LED screens, prints, banners, and murals can be attached or projected to these surfaces. LED screens may be dynamic and change frequently or be static. Furthermore, the LED screens may be synchronized with smart phones and change the branding or marketing according to a visitor's preferences.

In some embodiments, these surfaces for advertisement, visual messaging, branding, or visual identity marketing can be connected to a controller. To the extent these surfaces require power (e.g., for an LED display screen, for lighting, etc.), the controller can direct power from an energy storage unit to such components. In some embodiments, these surfaces can include photovoltaic modules that capture solar energy and, during conditions where the photovoltaic modules are not capturing solar energy (e.g., at night), such surfaces can provide display advertisements, visual messaging, branding, or visual identity marketing.

Figure 23:
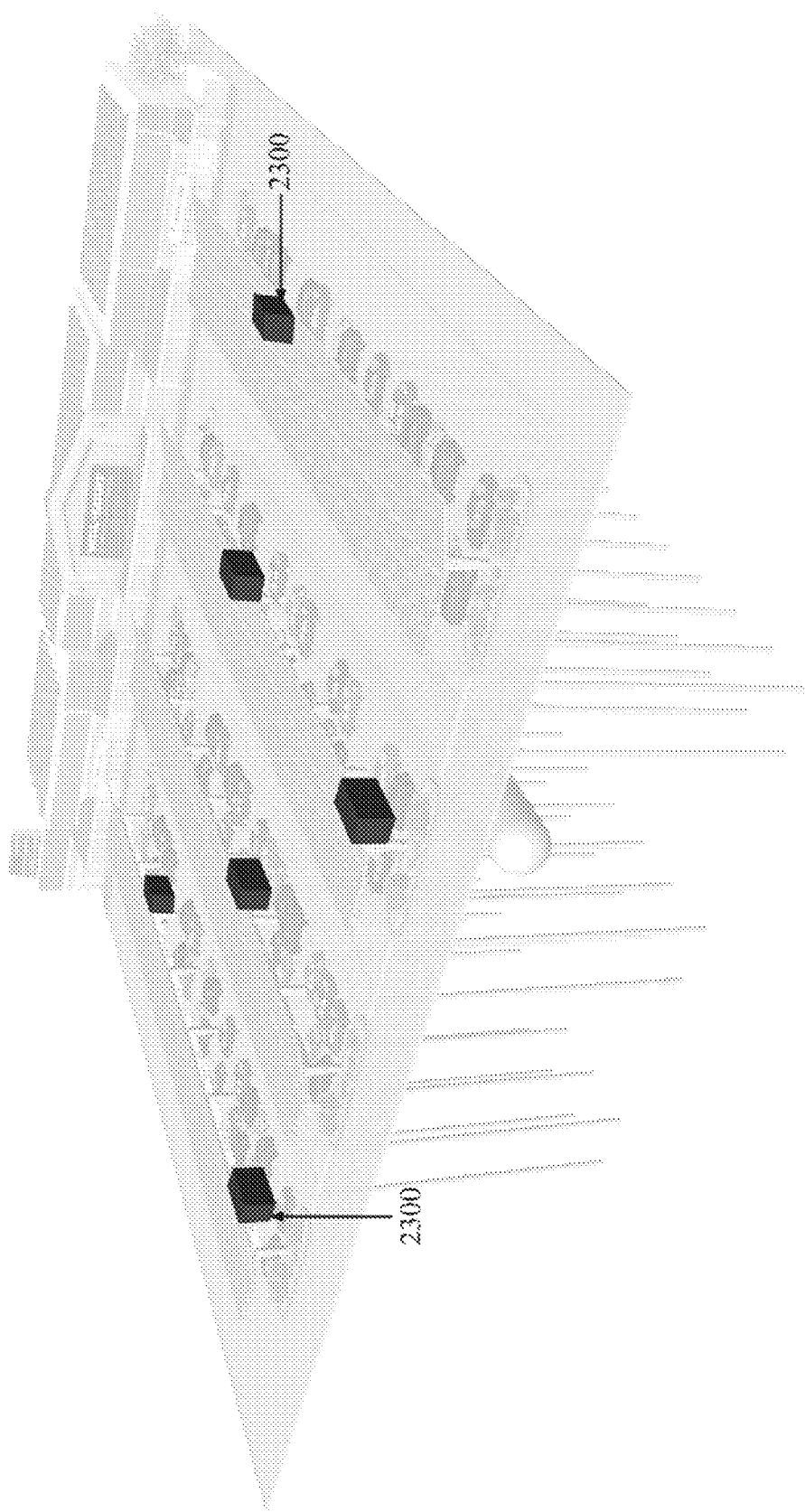
FIG. 23 is an illustrative example of a retail space formed as part of the integrated renewable energy and asset system in accordance with some embodiments of the disclosed subject matter.

In some embodiments, the integrated renewable energy and asset system can also include space 2300 for new retail opportunities as illustrated in FIG. 23. In this particular example, the designated retail areas 2300 are located beneath the parking carports in the parking lot area. However, this is merely illustrative and such space can be positioned in other areas near the parking lot or building. The spaces can be enclosed with a material, such as concrete masonry units (cinder blocks) or any other desired material. The canopy of the carport can provide a roof enclosure for the space. Branding and other advertisement can be attached or printed onto the enclosure.

In some embodiments, the control system or any other suitable controller can direct electrical energy from a storage unit or any other suitable source to retail area 2300. For example, in response to receiving a signal that retail area 2300 is in use, the control system can direct electrical energy from a battery located adjacent to the building. In another example, the control system can direct electrical energy from a micro-inverter connected to a vertical column, where the micro-inverter converts the output from the photovoltaic modules being supported by the vertical column to an alternating current for use by retail area 2300.

In some embodiments, the control system or any other suitable control can direct thermal energy from a storage unit or any other suitable source to retail area 2300. For example, in response to receiving a signal that retail area 2300 is in use and/or that the temperature or conditions of retail area 2300 are less than a given threshold value, the control system can direct thermal energy from the storage unit to retail area 2300. In a more particular example, thermal energy captured from geothermal tubes can be directed to retail area 2300.

Figure 24:
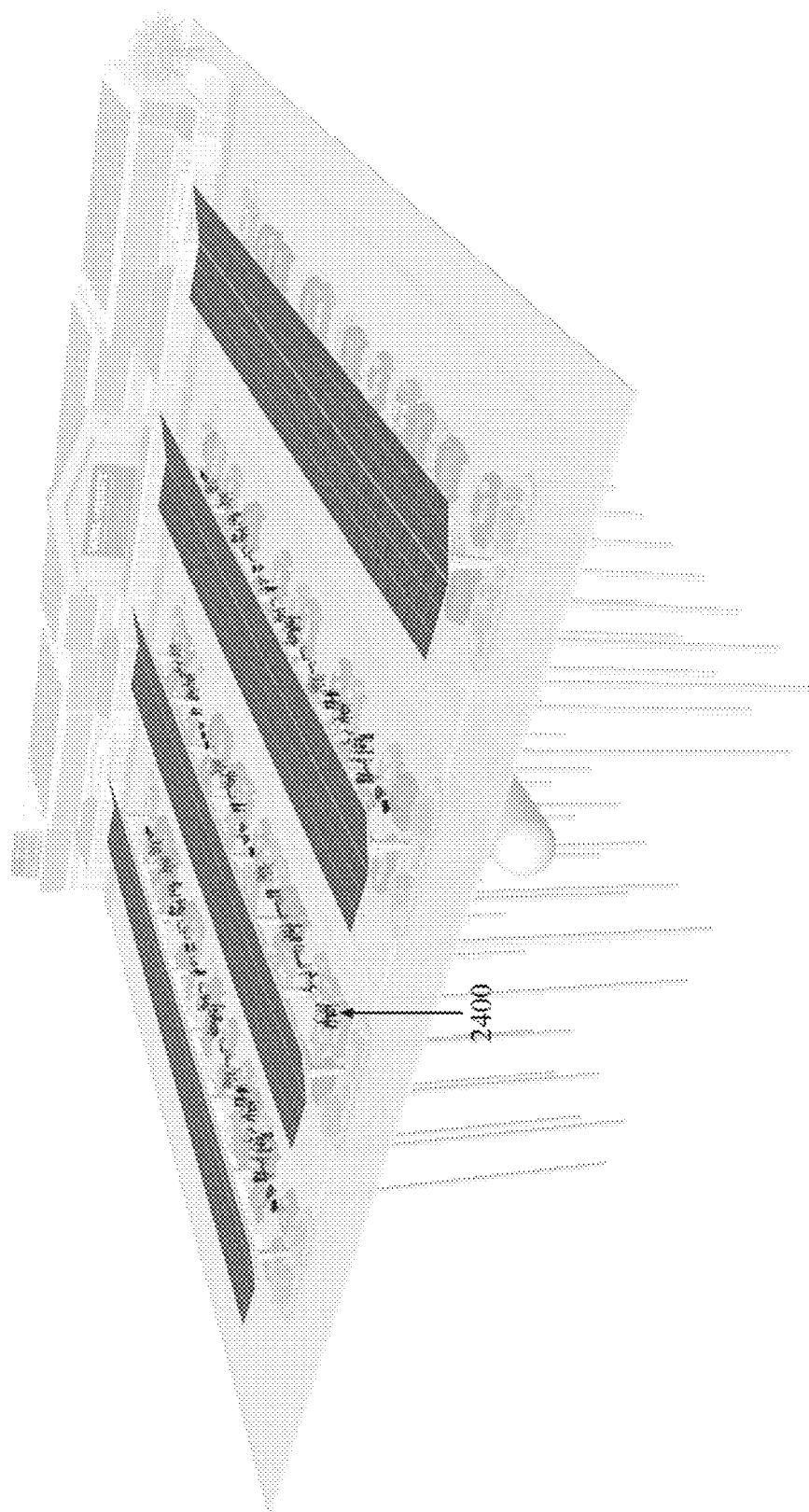
FIG. 24 is an illustrative example of an outdoor space formed as part of the integrated renewable energy and asset system in accordance with some embodiments of the disclosed subject matter.

In some embodiments, the integrated renewable energy and asset system can also include space for outdoor events as illustrated in FIG. 24. The parking canopy as shown in FIG. 6 can serve as protection for these events from weather related elements, such as snow, rain, and sun. These events can include social gatherings, special event and holiday celebrations, exterior conference space, office parties and cook-outs, tailgating for sporting events, and other cultural celebrations, such as weddings and bar mitzvahs.

Figure 25:
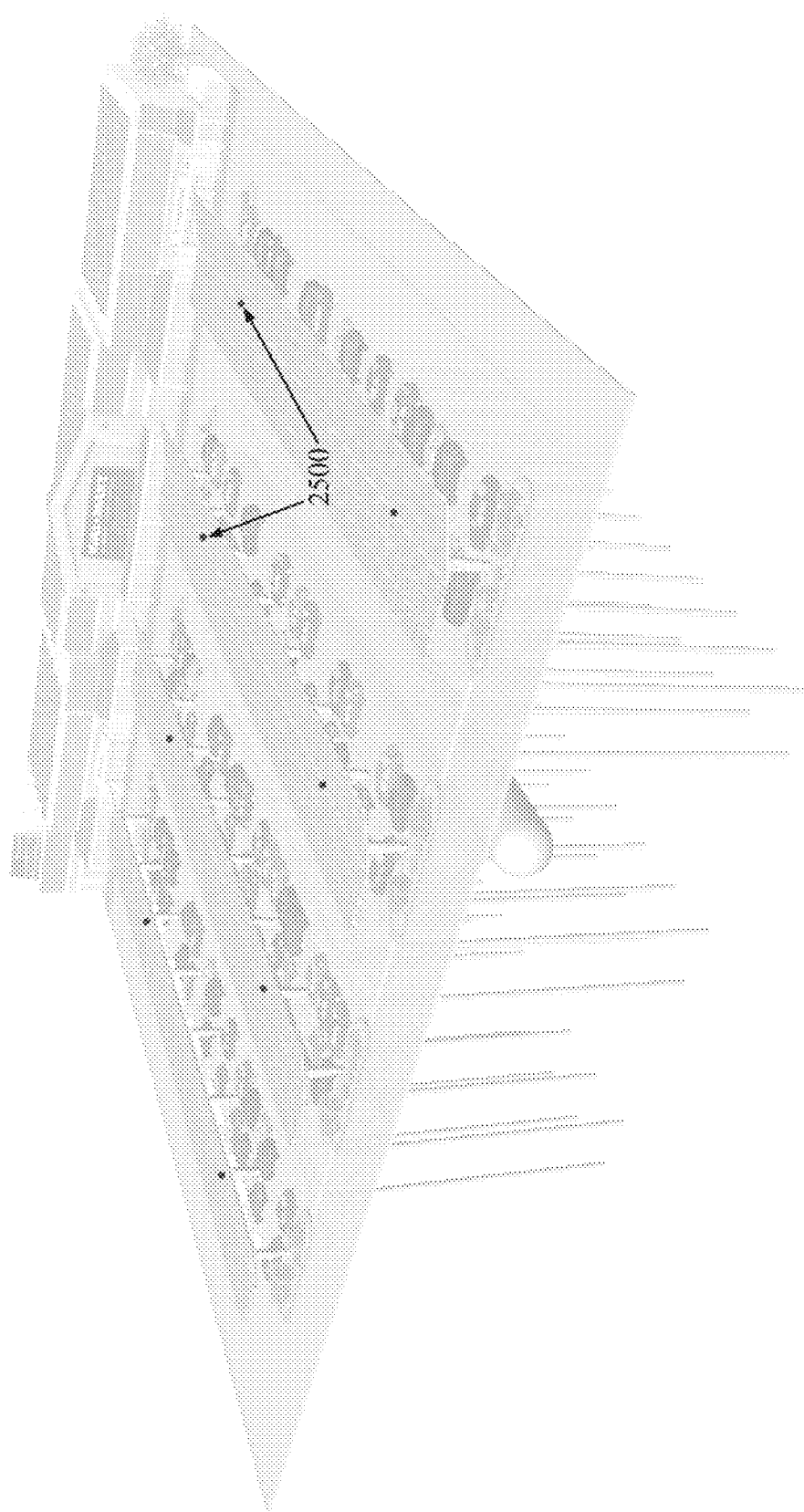
FIG. 25 is an illustrative example of a video monitoring system of the integrated renewable energy and asset system in accordance with some embodiments of the disclosed subject matter.

In some embodiments, a video monitoring system 2500 can also be installed and integrated as part of the integrated renewable energy and asset system as illustrated in FIG. 25. In this example, the video surveillance equipment can be integrated within the carport on the columns. However, this is merely illustrative and the video monitoring equipment can be located in other areas of the parking lot or near the building. This type of surveillance equipment can, for example, enhance site security and help to deter vandalism. It can be either powered by the photovoltaic technologies described herein or by the utility grid.

Figure 26:
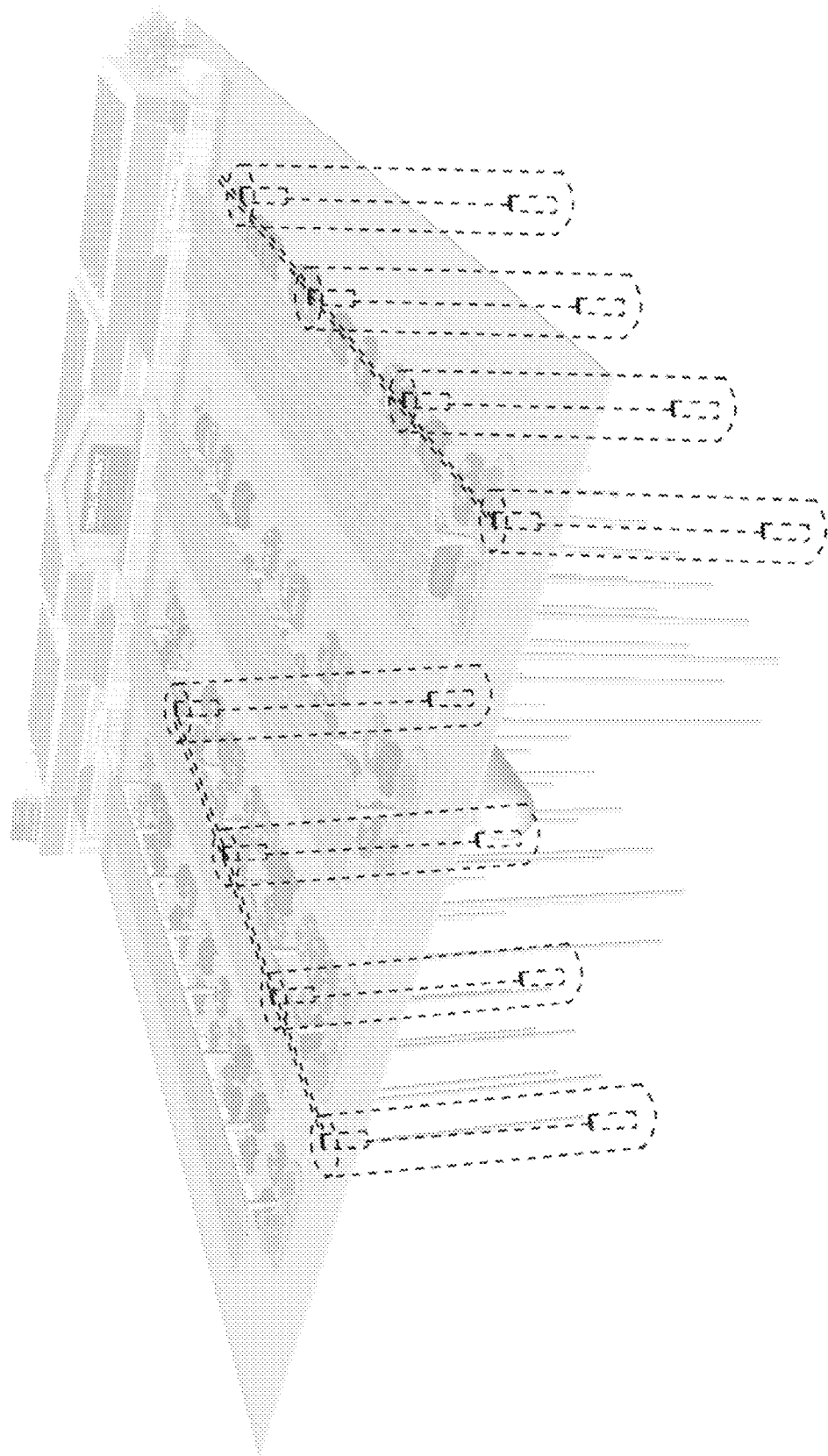
FIG. 26 is an illustrative example of an alternating weight-based energy storage system of the integrated renewable energy and asset system in accordance with some embodiments of the disclosed subject matter.

In some embodiments, an alternating weight-based energy storage system can also be installed and integrated as part of the integrated renewable energy and asset system as illustrated in FIG. 26. In this example, the storage system is installed in a bore hole underneath the parking lot. However, this is merely illustrative and the storage system can be installed in any other suitable location (e.g., a location near or around the parking lot or building). As shown, the storage system can have multiple storage units that alternate use based, for example, on the time of day. More particularly, energy storage units can alternate between a high position and a low position. When the sun is available, the photovoltaic modules in the integrated renewable energy and asset system can be used to charge an energy storage unit in the high position. When the sun is no longer available (e.g., due to the time of the day, due to weather, etc.), the weighted system can lower the energy storage unit and use the gravitational potential energy of the weighted energy storage unit to generate energy. In turn, the other energy storage unit is returned to the high position of the weighted system, where it awaits electrical energy from one or more of the photovoltaic modules.

It should be noted that the integrated renewable energy and asset system can include any suitable combination of the components or systems described herein. For example, the integrated renewable energy and asset system can include a geothermal system that is connected to a solar panel system or other energy production component, where captured thermal energy can be used to melt ice and/or snow off the solar panels, melt ice and/or snow off the parking lot, melt ice off a building adjacent or connected to the parking lot, heat water in a cistern, heat water for an adjacent building, and/or heat the adjacent building. In another example, the integrated renewable energy and asset system can include a solar thermal system that is connected to a solar panel system or other energy production component, where captured thermal energy can be used to melt ice and/or snow off the solar panels, melt ice and/or snow off the parking lot, melt ice off a building adjacent or connected to the parking lot, heat water in a cistern, heat water for an adjacent building, and/or heat the adjacent building.

In yet another example, the integrated renewable energy and asset system can include an advertising system that is connected to a solar panel system or other energy production component, where captured energy can be used to power one or more LED advertisement screens of the advertising system. In a further example, the integrated renewable energy and asset system can include a branding system that is connected to a solar panel system or other energy production component, where captured energy can be used to power one or more LED branding screens of the branding system.

In a further example, the integrated renewable energy and asset system can include a lighting system that is connected to a solar panel system or other energy production component, where captured energy can be used to power one or more lights of the lighting system. In a further example, the integrated renewable energy and asset system can include an electric vehicle charging system that is connected to a solar panel system or other energy production component, where captured energy can be used to power and/or charge one or more electric vehicle chargers. In a further example, the integrated renewable energy and asset system can include a solar canopy system that is connected to retail spaces positioned in the parking lot, where captured energy from the canopy system can be used to power the retail spaces while also providing shelter to the retail spaces. In a further example, the integrated renewable energy and asset system can include a video monitoring system that is connected to a solar panel system or other energy production component, where captured energy can be used to power cameras and/or other video surveillance equipment.

In a further example, the integrated renewable energy and asset system can include a battery storage system that is connected to a plurality of solar panel systems or other energy production components, where captured energy can be stored in the battery storage system. In a further example, the integrated renewable energy and asset system can include a grid resilience system with demand response capabilities that is connected a solar panel system or other energy production component (e.g., roof mounted solar panels, solar parking canopies, a photovoltaic flag, a photovoltaic billboard, a building that is integrated with photovoltaics, etc.), where captured energy can be used to input energy into the grid resilience system.

In a further example, the integrated renewable energy and asset system can include a bicycle storage system that is connected to a solar panel system or other energy production component, where the solar panel system, photovoltaic carport canopy, or any other suitable solar structure can integrate bicycle storage and tire pump storage that protects the bicycles.

Figure 27:
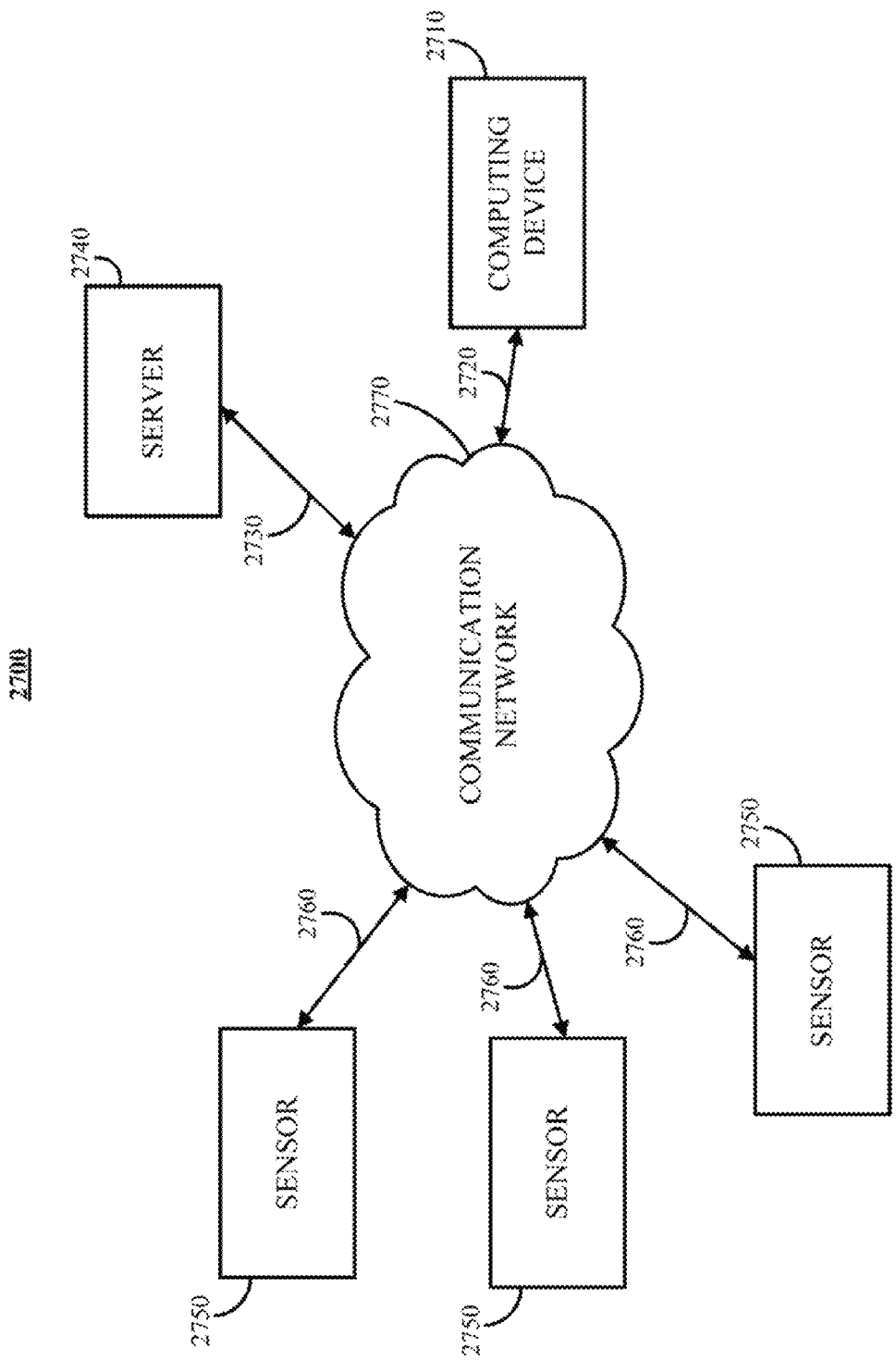
FIG. 27 shows a schematic diagram of an illustrative system suitable for implementation of the mechanisms described herein for controlling the integrated renewable energy and asset system in accordance with some embodiments of the disclosed subject matter.

As described herein, the integrated renewable energy and asset system can be controlled by a controller or any other suitable control system. Turning to FIG. 27, FIG. 27 shows an example 2700 of a generalized schematic diagram of a control system on which the mechanisms for providing the integrated renewable energy and asset system can be implemented in accordance with some embodiments of the disclosed subject matter. As illustrative, system 2700 can include a computing device 2710. Computing device 2710 can be connected by one or more communications links 2720 that can, in turn, be linked to a server 2730 via a communications link 2740. Computing device 2710 can, for example, be used to present sensor data and provide instructions for directing stored energy (e.g., transmit electrical energy from a storage battery to an electric vehicle charging station, transmit thermal energy from a geothermal heat pump to the surface of the solar canopy, direct water from a cistern to a water tank that supplies water to a building, etc.). In a more particular example, computing device 2710 can provide multiple interfaces to interacting with the various components of the integrated renewable energy and asset system, such as an interface for setting threshold values (e.g., water levels, power levels, temperature values, etc.), an interface for controlling the geothermal system, an interface for controlling the photovoltaic system, an interface for controlling the water collection system, an interface for monitoring multiple sensors positioned throughout the integrated renewable energy and asset system, etc.

As also shown in FIG. 27, system 2700 can include one or more sensors 2750. Sensors 2750 can be any suitable device that can gather and/or provide sensor data relating to a component that is a part of the integrated renewable energy and asset system.

In some embodiments, sensor 2750 can be a temperature sensor. For example, the temperature sensor can be embedded in a photovoltaic module on a canopy supported by a vertical column. In another example, the temperature sensor can be positioned on a photovoltaic module so that it measures the temperature of the surface of the photovoltaic module. In yet another example, the temperature sensor can be connected to the geothermal system to provide the temperature of the thermal energy stored in the geothermal tubes. In a further example, the temperature sensor can be connected to the surface of a parking area that is covered by the solar carport structure so that the temperature of the parking area can be measured. Determination on how the integrated renewable energy and asset system operates can be made based on the temperature information provided by the temperature sensor.

In some embodiments, sensor 2750 can be a flow sensor or any other suitable sensor for monitoring water usage. For example, the flow sensor can be connected to a cistern for potable water or grey water to measure the amount of water that is being stored in the cistern. In another example, the flow sensor can be connected to a water tank or other water storage unit that provides water to a building adjacent to the parking lot having the cistern. Determinations on how the integrated renewable energy and asset system operates can be made based on the water usage information provided by the flow sensor.

In some embodiments, sensor 2750 can be an energy level sensor or meter. For example, an energy level sensor can be connected to each micro-inverter installed on a column that supports a number of photovoltaic modules. In another example, an energy level sensor can be connected to a central inverter that stores the energy being captured by the photovoltaic modules in the integrated renewable energy and asset system (e.g., the photovoltaic modules on the solar carport structures, the photovoltaic modules on the solar rooftop structures, the photovoltaic modules integrated into the building adjacent to the parking lot, the photovoltaic modules integrated in the advertisements placed in the parking lot and the building, etc.).

Additionally or alternatively, sensor 2750 can be an image sensor (e.g., a camera, a video recorder, etc.), an audio sensor (e.g., a microphone, a sound lever meter, etc.), a radio-frequency identification (RFID) sensor, etc.

In some embodiments, sensor 2750 can be connected to a computing device that controls a particular portion of the integrated renewable energy and asset system. For example, the temperature sensor can be a device that is configured to provide particular temperature information obtained by a control system that manages the geothermal system. In this particular example, the geothermal system can include multiple sensors that measure the temperature of the geothermal tubes placed beneath the parking lot and the temperature information obtained by the temperature sensor can be the average temperature of the geothermal tubes, the highest temperature from any one of the geothermal tubes, etc.

Sensors 2750 can be local to each other or remote from each other. Each sensor 2750 can be connected by one or more communications links 2760 to communication network 2770 that can, in turn, be linked to server 2740 via communications link 2730 and/or computing device 2710 via communications link 2720.

System 2700 can include one or more servers 2740. Server 2740 can be any suitable server or servers for providing access to the mechanisms described herein for controlling the integrated renewable energy and asset system, such as a processor, a computer, a data processing device, or any suitable combination of such devices. For example, the mechanisms for controlling the integrated renewable energy and asset system can be distributed into multiple backend components and multiple frontend components and/or user interfaces. In a more particular example, backend components can be performed on one or more servers 2740. In another more particular example, frontend components (such as presentation of control panel) can be performed on one or more computing devices 2710.

In some embodiments, server 2740 can receive temperature information from a temperature sensor 2750 and, in response to receiving the temperature information, open particular pipes or other connectors to cause thermal energy to flow to a particular location. For example, when the temperature sensor is embedded in a photovoltaic module on a canopy supported by a vertical column, server 2740 can determine whether to direct thermal energy to a thermal tube that is integrated with the photovoltaic module (e.g., in response to the temperature being less than a threshold temperature). In another example, a temperature sensor can be positioned on a photovoltaic module so that it measures the temperature of the surface of the photovoltaic module and another temperature sensor can be connected to the geothermal system to provide the temperature of the thermal energy stored in the geothermal tubes. Server 2740 can compare the temperature information received from these temperature sensors to determine when to transmit thermal energy from a geothermal tube or a geothermal heat pump to a particular location.

It should be noted that additional information can be retrieved from server 2740 when making determinations to direct stored energy in the integrated renewable energy and asset system. For example, server 2740 and/or computing device 2710 can via communications network 2770 access a web resource containing weather-related information. In response to determining that it is likely to snow, server 2740 can transmit a signal to the geothermal heat pump to open particular pipes that direct thermal energy to the thermal tubes located on the surface of the solar canopy.

In some embodiments, server 2740 can receive water usage information from sensor 2750 and, in response to determining that a water level in a water tank is below a given threshold value, server 2740 can alter the water flow by opening particular valves or other connectors such that water flows from an underground cistern to the water tank. In some embodiments, computing device 2710 can be used to communicate instructions to server 2740, such as which cistern is used to provide water—e.g., a potable water cistern or a grey water cistern. Additionally or alternatively, server 2740 can allow the water containment system and the geothermal system to work together—e.g., server 2740 can cause particular water pipes to be opened to direct water from a cistern to a water tank and then cause thermal energy to be directed through pipes from a geothermal heat pump to heat the water in the water tank.

In some embodiments, server 2740 can receive energy level information from sensor 2750. For example, server 2740 can direct a central inverter that stores the energy being captured by the photovoltaic modules in the integrated renewable energy and asset system (e.g., the photovoltaic modules on the solar carport structures, the photovoltaic modules on the solar rooftop structures, the photovoltaic modules integrated into the building adjacent to the parking lot, the photovoltaic modules integrated in the advertisements placed in the parking lot and the building, etc.) to transmit electrical energy to various locations—e.g., an electrical utility grid, an adjacent building, a component of the integrated renewable energy and asset system that requires power, etc.

In some implementations, each of computing devices 2710, sensors 2750, and server 2740 can be any of a general purpose device, such as a computer, or a special purpose device, such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 2710 can be implemented as a smartphone, a tablet computer, a wearable computer, a vehicle computing and/or entertainment system (e.g., as used in a car, a boat, an airplane, or any other suitable vehicle), a laptop computer, a portable game console, a television, a set-top box, a digital media receiver, a game console, a thermostat, a home automation system, an appliance, any other suitable computing device, or any suitable combination thereof.

Communications network 2760 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), a peer-to-peer connection, etc. Each of communications links 2720, 2730, and 3760 can be any communications links suitable for communicating data among computing devices 2710, sensors 2750, and server 2740, such as network links, dial-up links, wireless links, hard-wired links, any other suitable communications links, or any suitable combination of such links. Note that, in some implementations, multiple servers 2740 can be used to provide access to different mechanisms associated with the mechanisms described herein for personalizing services based on mood and/or behavior information from multiple data sources. For example, system 2700 can include: a photovoltaic energy server that obtains information and control the energy flow of the multiple photovoltaic modules installed in the integrated renewable energy and asset system; a geothermal energy server that obtains information and controls the thermal energy flow of the geothermal tubes, thermal tubes, and solar thermal heat traces installed in the integrated renewable energy and asset system; a water containment server that obtains information and controls the water flow from the cisterns, water tanks, and water storage units installed in the integrated renewable energy and asset system; and/or any other suitable servers for performing any suitable functions of the mechanisms described herein.

A more particular example of system 2700 in connection with the structural framework of the integrated renewable energy and asset system is shown in FIGS. 28 and 29.

Turning to FIG. 28, an existing parking lot is shown having an existing parking striping pattern 2865 and a building 2860 adjacent to the parking lot. To prepare the parking lot for installing the integrated renewable energy and asset system, bore holes are drilled into the parking lot. The locations of the bore holes are based on the existing parking striping pattern 2865 and on the orientation of the parking lot with building 2860. As shown in FIG. 28, rows of bore holes are drilled that are substantially parallel to the existing parking striping pattern 2865.

In a portion of the bore holes, a photovoltaic canopy foundation that includes a vertical column for supporting a solar carport structure can be placed. Additionally, in some embodiments, while the parking lot is being prepared, electrical trenches 2830 that transmit the captured energy from the photovoltaic modules to a storage unit 2855. In some embodiments, electric vehicle charging stations 2820 can be installed, where each electric vehicle charging station can be mounted to a vertical column that supports a solar carport structure and can be connected to an electrical connection in electrical trench 2830.

In some embodiments, water pipe trenches 2840 can be formed such that water can flow from the surface of the solar carport structure through the vertical column and into the water pipe trench, where the water can be stored in water cistern 2870.

In a portion of the bore holes, a geothermal well or any other suitable geothermal tubes can be placed. In addition, geothermal trenches 2835 can be formed such that thermal energy can flow from the geothermal wells to a geothermal heat pump 2850. In this embodiment, geothermal heat pump 2850 can direct the thermal energy to any suitable location in the integrated renewable energy and asset system (e.g., the surface of the solar carport structures, the surface of a parking area, etc.).

In some embodiments, as also shown in FIGS. 28 and 29, one or more wind turbines 2815 can be connected to the integrated renewable energy and asset system. As shown, wind turbines 2815 can be placed in a row based on the orientation of the parking lot and the orientation of the building. Wind turbines 2815 can convert kinetic energy from the wind into electrical energy. More particularly, the electrical energy obtained from wind turbines 2815 can be connected to the storage unit using the same wiring connected to the photovoltaic modules (e.g., on the solar canopy, on the rooftop structure, etc.). It should be noted that a shared electrical trench can be prepared to connect wind turbines 2815 to photovoltaic modules on the canopies 2805, electric vehicle charging stations 2820, and other photovoltaic modules in the integrated renewable energy and asset system. Each of these energy-producing modules can be connected to storage unit 2855.

Figure 30:
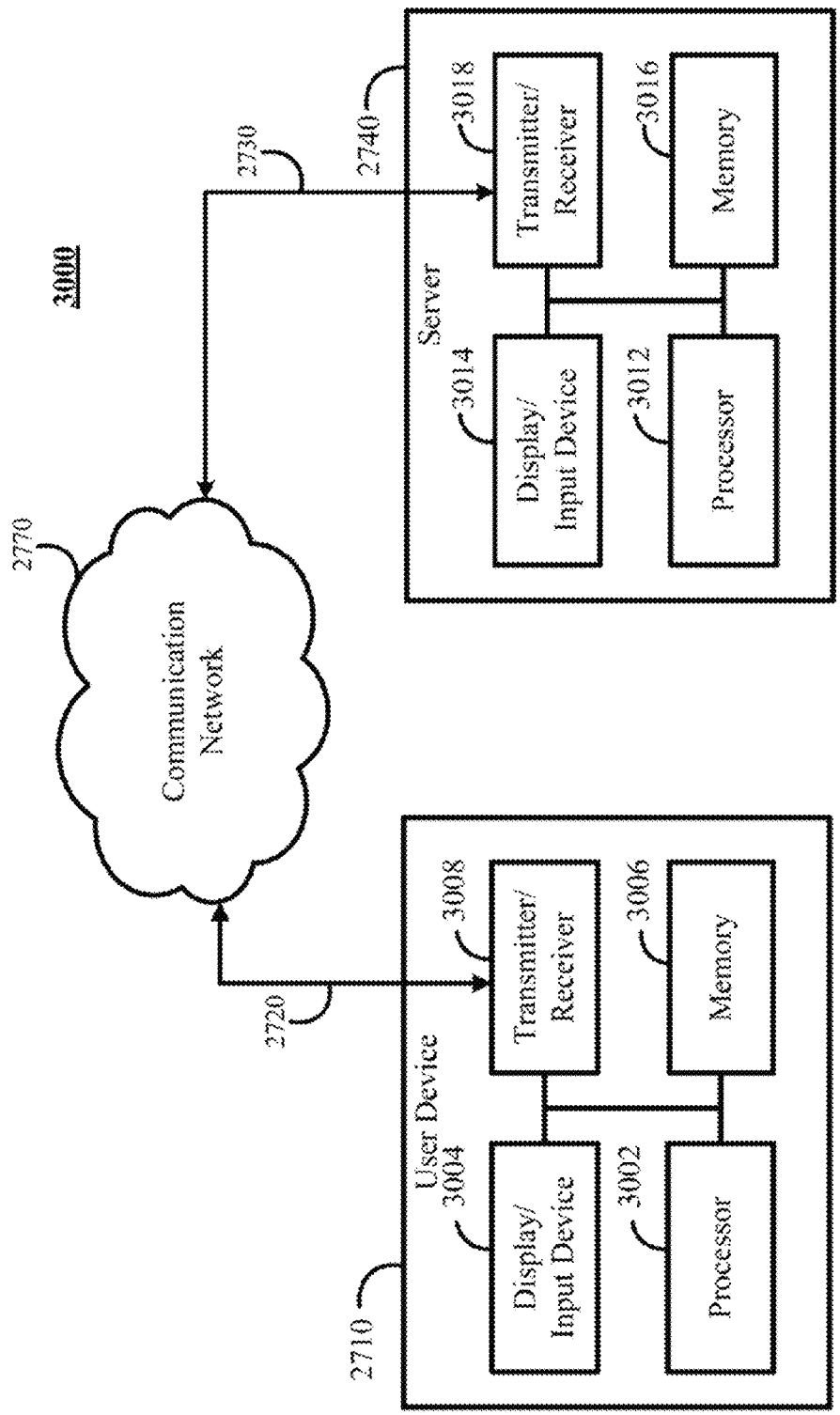
FIG. 30 shows a detailed example of hardware that can be used to implement one or more of the computing devices and servers depicted in FIG. 27 in accordance with some embodiments of the disclosed subject matter.

FIG. 30 shows an example 3000 of hardware that can be used to implement one or more of computing devices 2710 and servers 2740 depicted in FIG. 27 in accordance with some implementations of the disclosed subject matter. Referring to FIG. 30, computing device 2710 can include a hardware processor 3002, a display/input device 3004, memory 3006, and a transmitter/receiver 3008, which can be interconnected. In some implementations, memory 3006 can include a storage device (such as a computer-readable medium) for storing a user device program for controlling hardware processor 3002.

Hardware processor 3002 can use the user device program to execute and/or interact with the mechanisms described herein for controlling an integrated renewable energy and asset system, which can include presenting one or more interfaces (e.g., for inputting settings, for inputting threshold values, for selecting sensors, etc.), and can include executing an action in the system. In some implementations, hardware processor 3002 can transmit and receive data through communications link 2720 or any other communication links using, for example, a transmitter, a receiver, a transmitter/receiver, a transceiver, and/or any other suitable communication device, such as transmitter/receiver 308. Display/input device 3004 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 3008 can include any suitable transmitter and/or receiver for transmitting and/or receiving, among other things, instructions for presenting content, information related to a current control level, requests for location information, etc., and can include any suitable hardware, firmware and/or software for interfacing with one or more communication networks, such as network 2770 shown in FIG. 27. For example, transmitter/receiver 3008 can include: network interface card circuitry, wireless communication circuitry, and/or any other suitable type of communication network circuitry; one or more antennas; and/or any other suitable hardware, firmware and/or software for transmitting and/or receiving signals.

Server 2740 can include a hardware processor 3012, a display/input device 3014, memory 3016 and a transmitter/receiver 3018, which can be interconnected. In some implementations, memory 3016 can include a storage device (such as a computer-readable medium) for storing a recommendation program for controlling hardware processor 3012.

Hardware processor 3012 can use the recommendation program to execute and/or interact with the mechanisms described herein for: determining when to direct stored energy from a storage unit to a particular location or component; determining when thermal energy is needed to melt snow or ice from a surface; determining when electrical energy is to be provided to a utility grid; and/or transmitting and receiving data through communications link 2730. In some implementations, hardware processor 3012 can transmit and receive data through communications link 2730 or any other communication links using, for example, a transmitter, a receiver, a transmitter/receiver, a transceiver, and/or any other suitable communication device such as transmitter/receiver 3018. Display/input device 3014 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 3018 can include any suitable transmitter and/or receiver for transmitting and/or receiving, among other things, content to be presented, requests for status information, etc., and can include any suitable hardware, firmware and/or software for interfacing with one or more communication networks, such as network 2770 shown in FIG. 27. For example, transmitter/receiver 3018 can include: network interface card circuitry, wireless communication circuitry, and/or any other suitable type of communication network circuitry; one or more antennas; and/or any other suitable hardware, firmware and/or software for transmitting and/or receiving signals.

In some implementations, server 2740 can be implemented in one server or can be distributed as any suitable number of servers. For example, multiple servers 2740 can be implemented in various locations to increase reliability and/or increase the speed at which the server can communicate with computing devices 2710 and/or sensors 2750. Additionally or alternatively, as described above in connection with FIG. 27, multiple servers 2740 can be implemented to perform different tasks associated with the mechanisms described herein.

Accordingly, an integrated renewable energy and asset system is provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. An integrated renewable energy and asset system, the system comprising:
   a parking lot positioned adjacent to a building structure, wherein the parking lot has a pattern;
   a plurality of bore holes that are formed into the parking lot, wherein the plurality of bore holes are organized based on the pattern of the parking lot;
   a plurality of vertical columns inserted into at least a first portion of the plurality of bore holes, wherein:
      at least one crossbeam is installed on an upper portion of a vertical column of the plurality of vertical columns to form a support structure; and
      a canopy is connected to the at least one crossbeam and positioned on the support structure, wherein the canopy is formed from a plurality of attached solar modules, and wherein a plurality of thermal tubes are integrated with the plurality of attached solar modules;
   a plurality of geothermal tubes that capture thermal energy are inserted into at least a second portion of the plurality of bore holes, wherein each of the plurality of thermal tubes and each of the plurality of geothermal tubes are connected to a geothermal heat pump, and wherein each of the plurality of thermal tubes is connected to the geothermal heat pump;
   a first cistern connected to the plurality of geothermal tubes, wherein the plurality of geothermal tubes transfer thermal energy to water contained in the first cistern;
   a second cistern connected to the plurality of solar thermal panels, wherein the plurality of solar thermal panels transfer thermal energy to water contained in the second cistern;
   a third cistern in fluid communication with the first cistern and the second cistern, wherein the third cistern collects the water from each of the first cistern and the second cistern; and
   a hardware processor that is configured to:
      receive sensor information from a plurality of sensors disposed adjacent the canopy;
      determine whether to direct at least a portion of the thermal energy captured using the plurality of geothermal tubes to the plurality of attached solar modules to heat the plurality of attached solar modules based on the received sensor information; and
      cause at least a portion of the thermal energy captured using the plurality of geothermal tubes to be directed to the plurality of attached solar modules to heat the plurality of attached solar modules based on the determination.

2. The system of claim 1, wherein a lower portion of the vertical column of the plurality of vertical columns is positioned above a geothermal tube of the plurality of geothermal tubes within a bore hole.

3. The system of claim 1,
wherein a first portion of the plurality of geothermal tubes are inserted in bore holes that are made in a foundation beneath the parking structure, and
wherein a second portion of the plurality of geothermal tubes are integrated within the vertical column that sits on the parking structure.

4. The system of claim 1, further comprising:
solar thermal heat traces installed beneath areas designated on the parking lot,
wherein the hardware processor is further configured to determine whether to divert thermal energy stored in the geothermal heat pump to the solar thermal heat traces to melt snow or ice.

5. The system of claim 1, further comprising:
geothermal heat traces installed beneath areas designated on the parking lot,
wherein the hardware processor is further configured to determine whether to divert thermal energy stored in the geothermal heat pump to the geothermal heat traces to melt snow or ice.

6. The system of claim 5,
wherein the plurality of sensors include a temperature sensor connected to a surface of the areas designated on the parking lot, and
wherein the temperature sensor transmits temperature information relating to the surface of the areas to the hardware processor.

7. The system of claim 5,
wherein the plurality of sensors include an image sensor connected to a surface of the areas designated on the parking lot, and
wherein the image sensor transmits imaging information relating to the surface of the areas to the hardware processor.

8. The system of claim 1, wherein water from a surface of the canopy is diverted through the vertical column and into the first cistern, the second cistern, or the third cistern.

9. The system of claim 8, further comprising:
a water usage sensor connected to a water containment system corresponding to the building structure,
wherein the water usage sensor transmits water usage information to the hardware processor, and
wherein the hardware processor determines whether to transmit water from the third cistern to the water containment system.

10. The system of claim 1, further comprising:
a plurality of inverters that are each mounted to one of the plurality of vertical columns, wherein each of the plurality of inverters converts direct current output from the plurality of attached solar modules to an alternating current; and
an energy storage system that receives the alternating current from each of the plurality of inverters,
wherein the hardware processor is further configured to determine whether to direct the alternating current to at least one of: a utility grid, a device installed on one of the plurality of vertical columns, and the building structure.

11. The system of claim 10, wherein the energy storage system includes a weight-based energy storage system that is located in at least one of the plurality of bore holes beneath the parking lot.

12. The system of claim 10, further comprising:
a retail space that is electrically connected to the central inverter and at least a portion of the plurality of attached solar modules,
wherein the retail space is positioned such that a portion of a roof structure of the retail space is provided by the canopy that supports the plurality of attached solar modules, and
wherein the hardware processor is further configured to direct alternating current from the energy storage system to one or more devices installed in the retail space and direct the thermal energy from the geothermal heat pump to a heat trace installed beneath an area of the parking lot that corresponds to the retail space.

13. The system of claim 10, further comprising:
a plurality of wind turbines that are electrically connected to the energy storage system,
wherein the plurality of wind turbines are organized in a first row that is substantially parallel to a second row that includes the plurality of vertical columns.

14. The system of claim 10, wherein the hardware processor is further configured to:
receive a request from a utility grid for electrical energy;
transmit a request to one or more sensors connected to the energy storage system;
determine whether the energy storage system is capable of responding to the received request; and
transmit an instruction to the energy storage system to provide stored electrical energy from the energy storage system to an input of the utility grid.

15. The system of claim 10, further comprising:
an advertising system that includes one or more display screens for presenting advertisements,
wherein the advertising system receives at least a portion of the alternating current from the energy storage system.

16. The system of claim 10, further comprising:
a lighting system that includes a plurality of light sources,
wherein the lighting system receives at least a portion of the alternating current from the energy storage system.

17. The system of claim 16, wherein the hardware processor is further configured to detect motion in an area corresponding to one of the plurality of light sources and, in response to the detection, direct the portion of the alternating current from the energy storage system to that light source.

18. The system of claim 10, further comprising:
an electric vehicle charging station that is positioned adjacent to at least one of the plurality of vertical columns,
wherein the electric vehicle charging station is electrically connected to the energy storage system and at least one of the plurality of solar modules, and
wherein the electric vehicle charging station receives power from the energy storage system or said at least one of the plurality of solar modules.

19. The system of claim 1, wherein the hardware processor is further configured to:
determine, based on data received at the integrated renewable energy and asset system from one or more web resources, whether snow or ice is likely to be deposited on a surface of the plurality of attached solar modules or an area of the parking lot; and
cause the geothermal heat pump to direct the thermal heat captured by the plurality of geothermal tubes to be directed to the plurality of thermal tubes that are integrated with the plurality of attached solar modules or thermal traces.

20. An integrated renewable energy and asset system, the system comprising:
- a parking lot positioned adjacent to a building structure, wherein the parking lot has a pattern;
- a plurality of bore holes that are formed into the parking lot, wherein the plurality of bore holes are organized based on the pattern of the parking lot;
- a plurality of vertical columns inserted into at least a first portion of the plurality of bore holes, wherein:
  - at least one crossbeam is installed on an upper portion of a vertical column of the plurality of vertical columns to form a support structure, and
  - a canopy is connected to the at least one crossbeam and positioned on the support structure, wherein the canopy is formed from a plurality of attached solar modules, and wherein a plurality of thermal tubes are integrated with the plurality of attached solar modules;
- a plurality of geothermal tubes that capture thermal energy are inserted into at least a second portion of the plurality of bore holes, wherein each of the plurality of thermal tubes and each of the plurality of geothermal tubes are connected to a geothermal heat pump, and wherein each of the plurality of thermal tubes is connected to the geothermal heat pump;
- a plurality of inverters that are each mounted to one of the plurality of vertical columns, wherein each of the plurality of inverters converts direct current output from the plurality of attached solar modules to an alternating current;
- an energy storage system that receives the alternating current from each of the plurality of inverters; and
- a hardware processor that is configured to:
  - receive sensor information from a plurality of sensors disposed adjacent the canopy,
  - determine whether to direct at least a portion of the thermal energy captured using the plurality of geothermal tubes to the plurality of attached solar modules to heat the plurality of attached solar modules based on the received sensor information,
  - cause at least a portion of the thermal energy captured using the plurality of geothermal tubes to be directed to the plurality of attached solar modules to heat the plurality of attached solar modules based on the determination, and
  - determine whether to direct the alternating current to at least one of: a utility grid, a device installed on one of the plurality of vertical columns, and the building structure,
- wherein the energy storage system includes a weight-based energy storage system that is located in at least one of the plurality of bore holes beneath the parking lot.

* * * * *